US010511465B2

(12) United States Patent
Kawasaki et al.

(10) Patent No.: US 10,511,465 B2
(45) Date of Patent: Dec. 17, 2019

(54) TRANSMITTER, TRANSMISSION METHOD, RECEIVER, AND RECEPTION METHOD

(71) Applicant: SONY CORPORATION, Tokyo (JP)

(72) Inventors: Kenichi Kawasaki, Tokyo (JP); Hiroyuki Yamagishi, Tokyo (JP); Takahiro Takeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/065,997

(22) PCT Filed: Jan. 4, 2017

(86) PCT No.: PCT/JP2017/000013
§ 371 (c)(1),
(2) Date: Jun. 25, 2018

(87) PCT Pub. No.: WO2017/122555
PCT Pub. Date: Jul. 20, 2017

(65) Prior Publication Data
US 2019/0013975 A1 Jan. 10, 2019

(30) Foreign Application Priority Data
Jan. 15, 2016 (JP) ................. 2016-006004

(51) Int. Cl.
*H04L 27/00* (2006.01)
*H04B 1/40* (2015.01)
(Continued)

(52) U.S. Cl.
CPC .......... *H04L 27/0002* (2013.01); *H01P 3/165* (2013.01); *H04B 1/40* (2013.01);
(Continued)

(58) Field of Classification Search
CPC ..... H04L 27/0002; H04B 17/17; H04B 17/29; H04B 1/40; H04B 3/52; H04Q 1/24; H01P 3/165; H01Q 13/06
(Continued)

(56) References Cited

U.S. PATENT DOCUMENTS 6,912,651 B1 * 6/2005 Hamdi .................. G06F 13/385
345/163
9,378,110 B2 * 6/2016 Miyaoka ............. G06F 11/3041
(Continued)

FOREIGN PATENT DOCUMENTS

| CN | 103828193 A | 5/2014 |
|----|-------------|--------|
| CN | 104954296 A | 9/2015 |

(Continued)

OTHER PUBLICATIONS

International Search Report and Written Opinion of PCT Application No. PCT/JP2017/000013, dated Mar. 28, 2017, 06 pages of ISRWO.

(Continued)

*Primary Examiner* — James M Perez
(74) *Attorney, Agent, or Firm* — Chip Law Group

(57) ABSTRACT

The present technology relates to a transmitter, a transmission method, a receiver, and a reception method that can keep upsizing and cost increase to a minimum. The transmitter and the receiver have a detection mode and a communication mode as operation modes. The detection mode detects contact between a first waveguide on the side of the transmitter and a second waveguide on the side of the receiver. The communication mode sends or receives a modulated signal, acquired through frequency conversion of a baseband signal, via the first and second waveguides. The transmitter sends a given signal to the first waveguide in the detection mode. The transmitter and the receiver go from the (Continued)

detection mode to the communication mode in response to a given signal received by the receiver via the second waveguide and send and receive the modulated signal via the first and second waveguides in the communication mode.

13 Claims, 16 Drawing Sheets

(51) Int. Cl.
  *H04B 17/17* (2015.01)
  *H04B 17/29* (2015.01)
  *H01P 3/16* (2006.01)
  *H04B 3/52* (2006.01)
  *H04Q 1/24* (2006.01)
  *H01Q 13/06* (2006.01)

(52) U.S. Cl.
  CPC .............. *H04B 3/52* (2013.01); *H04B 17/17* (2015.01); *H04B 17/29* (2015.01); *H04Q 1/24* (2013.01); *H01Q 13/06* (2013.01)

(58) Field of Classification Search
  USPC .................................. 375/219–241, 256–353
  See application file for complete search history.

(56) References Cited

U.S. PATENT DOCUMENTS

| | | | |
|---|---|---|---|
| 9,991,954 B2* | 6/2018 | Fu ................... | H04B 10/07957 |
| 10,014,909 B2* | 7/2018 | Miyaoka ............ | G06F 11/3041 |
| 2003/0161419 A1* | 8/2003 | Bach ................. | H04B 1/525 |
| | | | 375/346 |
| 2004/0246509 A1* | 12/2004 | Hongo ................ | B41J 29/38 |
| | | | 358/1.6 |
| 2010/0296819 A1* | 11/2010 | Kahn ................. | H04B 10/60 |
| | | | 398/158 |
| 2011/0025552 A1* | 2/2011 | Sagala ................ | G01S 7/032 |
| | | | 342/109 |
| 2011/0051780 A1* | 3/2011 | Kawasaki ............. | H04B 1/40 |
| | | | 375/135 |
| 2011/0167250 A1* | 7/2011 | Dicks ................ | A61B 5/1112 |
| | | | 713/2 |
| 2012/0093041 A1* | 4/2012 | Takeda .............. | H04B 1/034 |
| | | | 370/280 |
| 2012/0207195 A1* | 8/2012 | Kawasaki ............ | H04B 1/04 |
| | | | 375/219 |
| 2013/0049680 A1* | 2/2013 | Katsumata ............ | H01M 2/34 |
| | | | 320/107 |
| 2013/0109317 A1* | 5/2013 | Kikuchi ............. | H04B 7/24 |
| | | | 455/41.2 |
| 2013/0195466 A1* | 8/2013 | Nakamura ........... | H04B 10/25 |
| | | | 398/115 |
| 2013/0205049 A1* | 8/2013 | Kawasaki ............ | H01L 23/48 |
| | | | 710/33 |
| 2013/0266026 A1* | 10/2013 | McCormack .......... | G06F 13/00 |
| | | | 370/474 |
| 2015/0061398 A1* | 3/2015 | Kudo ................. | H04B 5/0037 |
| | | | 307/104 |
| 2015/0168203 A1* | 6/2015 | Haas ................. | G01F 23/284 |
| | | | 73/290 R |
| 2015/0229119 A1* | 8/2015 | Tao ................... | H02H 3/16 |
| | | | 361/91.1 |
| 2015/0264515 A1* | 9/2015 | Uchida ............... | H01P 3/127 |
| | | | 455/41.2 |
| 2015/0278063 A1* | 10/2015 | Miyaoka ............. | G06F 11/3041 |
| | | | 375/257 |
| 2016/0118702 A1* | 4/2016 | Xu .................... | H01P 1/208 |
| | | | 333/209 |
| 2016/0164601 A1* | 6/2016 | Perron ............... | G01M 11/33 |
| | | | 398/38 |
| 2016/0226559 A1* | 8/2016 | Miyaoka ............ | G06F 11/3041 |
| 2016/0241305 A1 | 8/2016 | Uchida | |
| 2017/0336586 A1* | 11/2017 | Vaidyanathan ....... | G02B 6/4295 |
| 2018/0143931 A1* | 5/2018 | Miyaoka ............. | G06F 13/38 |
| 2018/0279601 A1* | 10/2018 | Bogdan .............. | A01M 29/18 |
| 2018/0341310 A1* | 11/2018 | Lambert ............. | G06F 1/266 |
| 2019/0013975 A1* | 1/2019 | Kawasaki ............ | H04B 1/40 |

FOREIGN PATENT DOCUMENTS

| | | | |
|---|---|---|---|
| EP | 2573951 | A1 | 3/2013 |
| EP | 2893612 | A1 | 7/2015 |
| JP | 2011-244179 | A | 12/2011 |
| JP | 2012-109700 | A | 6/2012 |
| JP | 2014-050271 | A | 3/2014 |
| JP | 2015-186068 | A | 10/2015 |
| JP | 6118286 | B2 | 4/2017 |
| JP | 6138076 | B2 | 5/2017 |
| WO | 2011/145491 | A1 | 11/2011 |
| WO | 2014/034966 | A1 | 3/2014 |

OTHER PUBLICATIONS

Extended European Search Report of EP Patent Application No. 17738310.6, dated Nov. 22, 2018, 09 pages.

Fukuda, et al., "A 12.5+12.5 Gb/s Full-Duplex Plastic Waveguide Interconnect", IEEE Journal of Solid-State Circuits. vol. 46, No. 12, Dec. 2011, 3113-3125 pages.

* cited by examiner

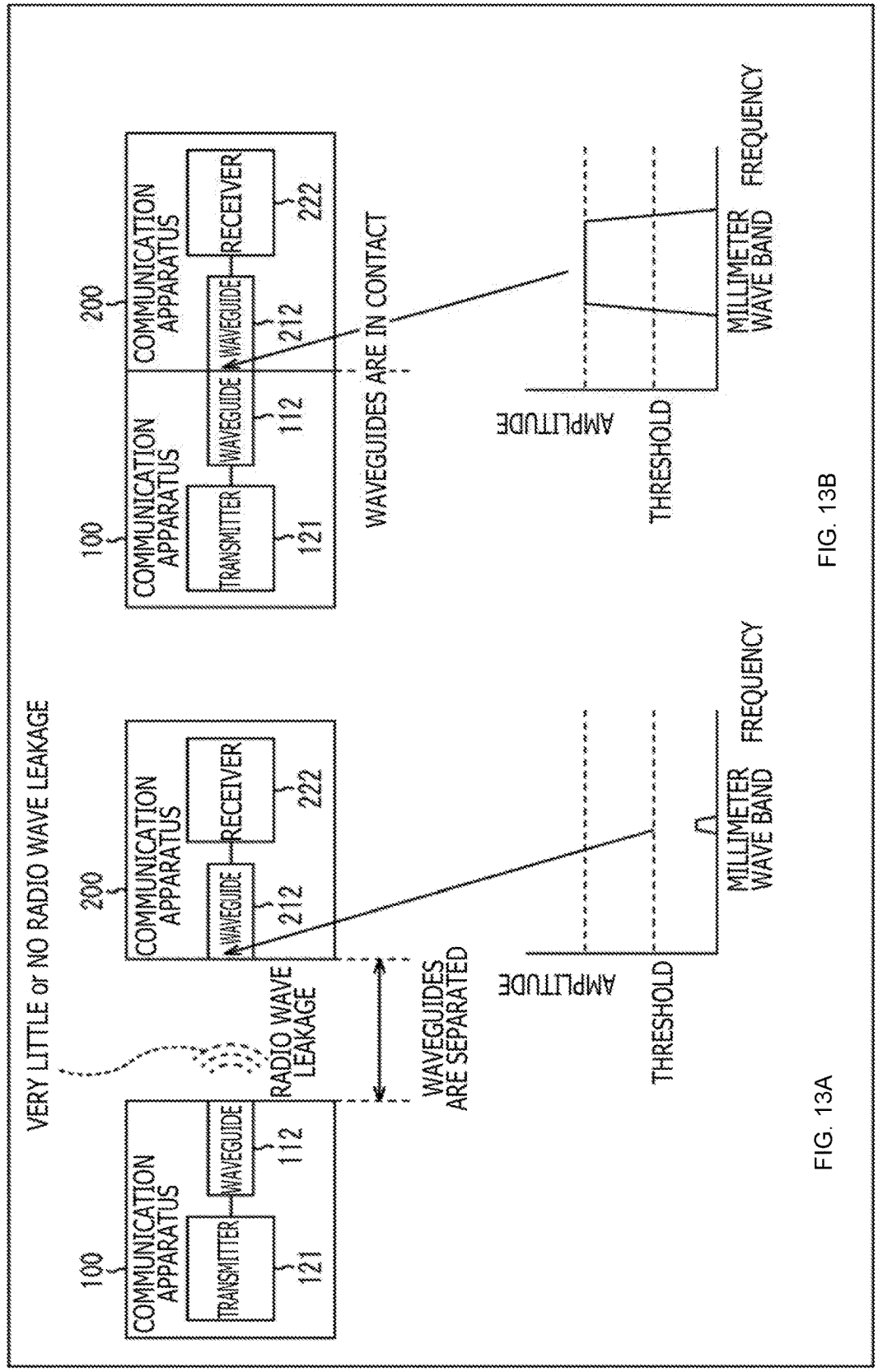

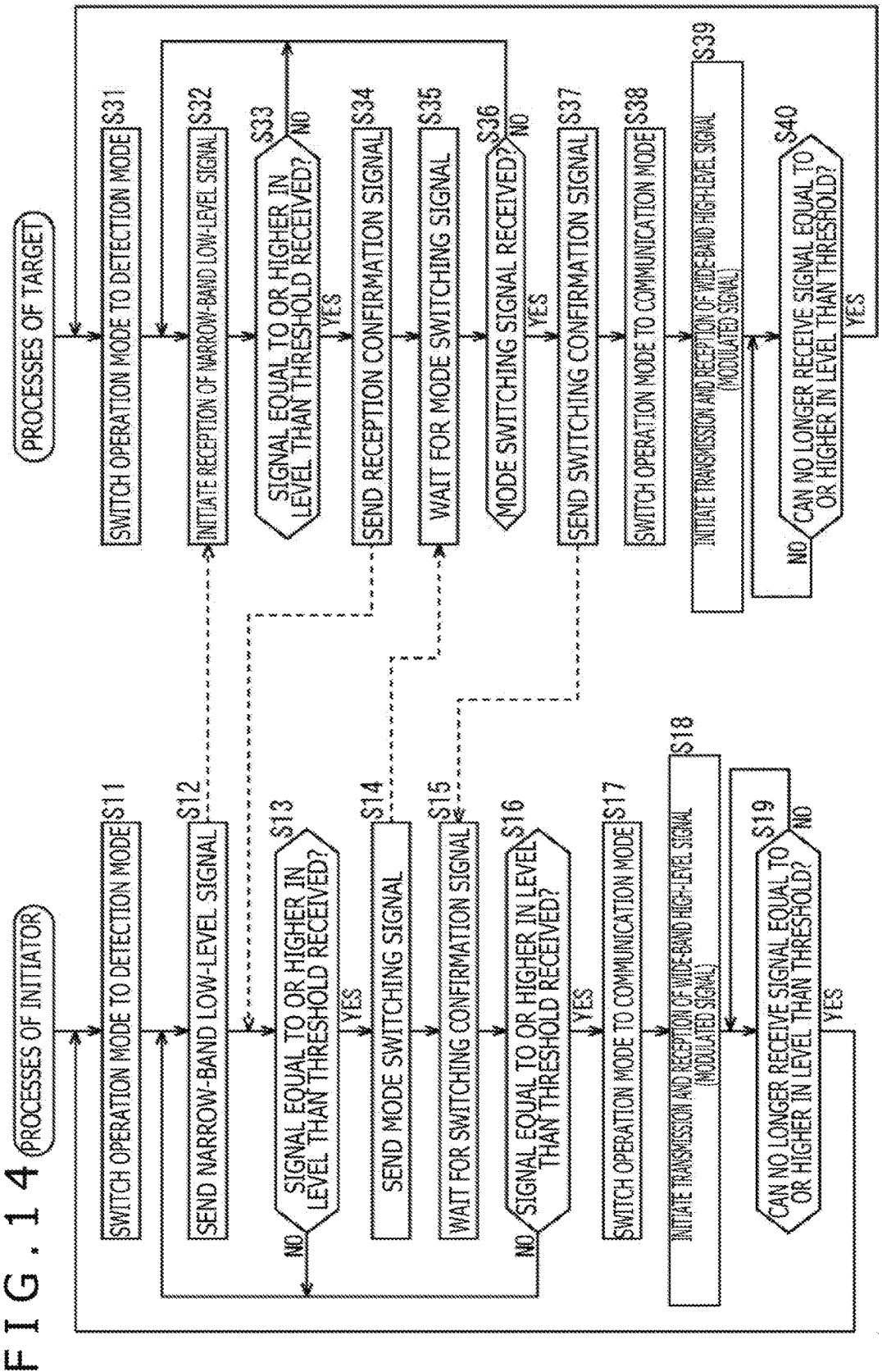

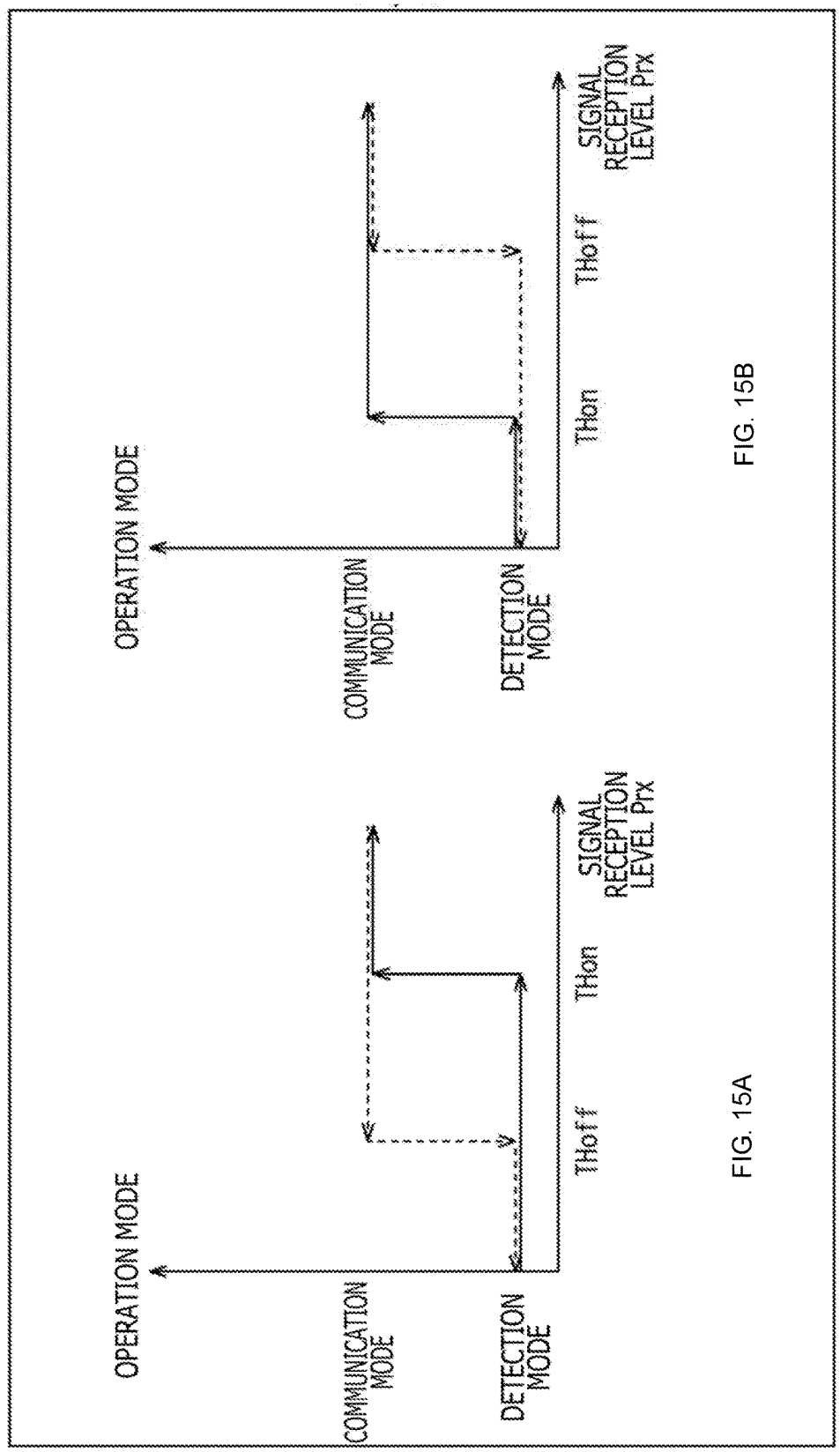

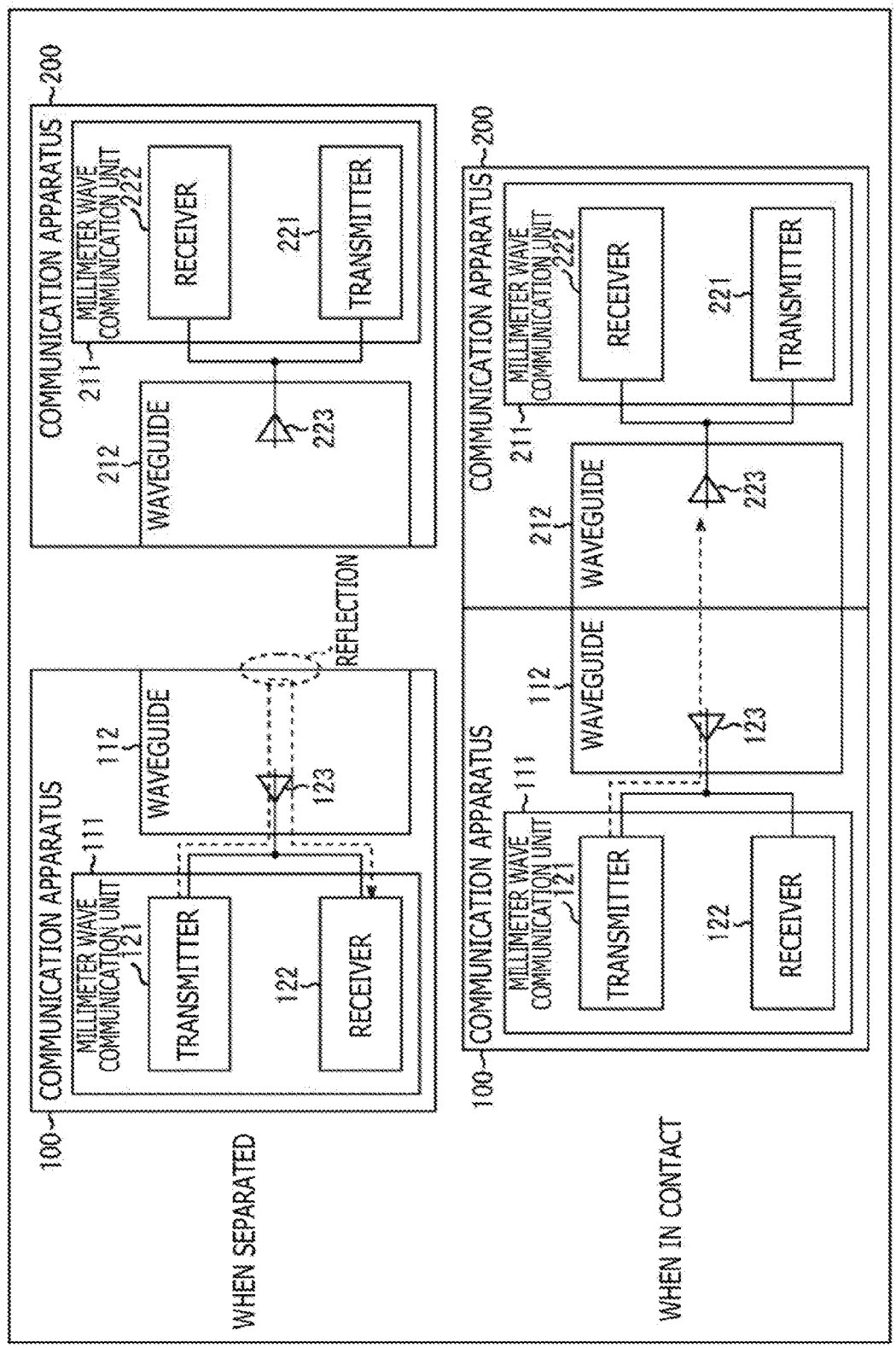

TRANSMITTER, TRANSMISSION METHOD, RECEIVER, AND RECEPTION METHOD

CROSS REFERENCE TO RELATED APPLICATIONS

This application is a U.S. National Phase of International Patent Application No. PCT/JP2017/000013 filed on Jan. 4, 2017, which claims priority benefit of Japanese Patent Application No. JP 2016-006004 filed in the Japan Patent Office on Jan. 15, 2016. Each of the above-referenced applications is hereby incorporated herein by reference in its entirety.

TECHNICAL FIELD

The present technology relates to a transmitter, a transmission method, a receiver, and a reception method, and particularly to a transmitter, a transmission method, a receiver, and a reception method that can keep upsizing and cost increase to a minimum.

BACKGROUND ART

For example, as a method of exchanging large capacity data between electronic circuits such as semiconductor chips and electronic equipment at high speed, a method is drawing attention that uses communication apparatuses for millimeter wave communication that send and receive data by modulating the data into a millimeter wave band signal (millimeter wave) (refer, for example, to PTL 1).

CITATION LIST

Patent Literature

[PTL 1]
JP 2012-109700A

SUMMARY

Technical Problems

A modulated signal acquired by modulating large capacity (high rate) data into a millimeter wave turns out to be a wide-band signal. As for such a wide-band modulated signal, it is necessary, from the viewpoint of compliance with the Radio Wave Law and other laws regulating radio wave, to ensure (approximate) freedom from radio wave leakage causing external leakage of modulated signal radio wave during transmission and reception of the modulated signal between communication apparatuses engaging in millimeter wave communication.

As a method of sending and receiving a modulated signal without any radio wave leakage, for example, there is a method of providing waveguides in communication apparatuses for millimeter wave communication and sending a modulated signal from one of the communication apparatuses to the other communication apparatus in the case where the waveguide of one of the communication apparatuses and the waveguide of the other communication apparatus are in contact with each other.

With the method of sending a modulated signal in the case where the waveguide of one of the communication apparatuses and the waveguide of the other communication apparatus are in contact with each other, it is necessary to perform contact detection to determine whether the waveguide of one of the communication apparatuses and the waveguide of the other communication apparatus are in contact with each other.

As a method of performing contact detection, there is a method of using a contact detection apparatus dedicated for contact detection.

However, in the case where contact detection is performed using a dedicated contact detection apparatus, it is necessary to provide contact detection apparatuses in communication apparatuses for millimeter wave communication, resulting in upsizing and cost increase of the communication apparatuses.

The present technology has been devised in light of such circumstances, and it is an object of the present technology to keep upsizing and cost increase to a minimum.

Solution to Problems

A transmitter of the present technology has a detection mode and a communication mode as operation modes. The detection mode detects contact between a first waveguide on a side of the transmitter and a second waveguide on a side of a receiver. The communication mode sends a modulated signal, acquired through frequency conversion of a baseband signal, via the first and second waveguides. The transmitter sends a given signal to the first waveguide in the detection mode, goes from the detection mode to the communication mode in response to the given signal received by the receiver via the second waveguide, and sends the modulated signal via the first and second waveguides in the communication mode.

A transmission method of the present technology is a transmission method of a transmitter having a detection mode and a communication mode as operation modes. The detection mode detects contact between a first waveguide on a side of the transmitter and a second waveguide on a side of a receiver. The communication mode sends a modulated signal, acquired through frequency conversion of a baseband signal, via the first and second waveguides. The transmitter sends a given signal to the first waveguide in the detection mode, goes from the detection mode to the communication mode in response to the given signal received by the receiver via the second waveguide, and sends the modulated signal via the first and second waveguides in the communication mode.

In the transmitter and the transmission method of the present technology, a given signal is sent to the first waveguide in the detection mode, and the operation mode is switched from the detection mode to the communication mode in response to the given signal received by the receiver via the second waveguide. Then, the modulated signal is sent via the first and second waveguides in the communication mode.

A receiver of the present technology has a detection mode and a communication mode as operation modes. The detection mode detects contact between a first waveguide on a side of a transmitter and a second waveguide on a side of the receiver. The communication mode receives a modulated signal, acquired through frequency conversion of a baseband signal, via the first and second waveguides. The receiver receives a given signal via the second waveguide in the detection mode, goes from the detection mode to the communication mode in response to the given signal via the second waveguide, and receives the modulated signal via the first and second waveguides in the communication mode.

A reception method of the present technology is a reception method of a receiver having a detection mode and a communication mode as operation modes. The detection mode detects contact between a first waveguide on a side of a transmitter and a second waveguide on a side of the receiver. The communication mode receives a modulated signal, acquired through frequency conversion of a baseband signal, via the first and second waveguides. The receiver receives a given signal via the second waveguide in the detection mode, goes from the detection mode to the communication mode in response to the given signal via the second waveguide, and receives the modulated signal via the first and second waveguides in the communication mode.

In the receiver and the reception method of the present technology, a given signal is received via the second waveguide in the detection mode, and the operation mode is switched from the detection mode to the communication mode in response to the given signal received via the second waveguide. Then, the modulated signal is received via the first and second waveguides in the communication mode.

It should be noted that the transmitter and the receiver may be independent apparatuses or internal blocks included in an apparatus.

Advantageous Effect of Invention

According to the present technology, it is possible to keep upsizing and cost increase to a minimum.

It should be noted that the effect described herein is not necessarily limited and may be any one of the effects described in the present disclosure.

BRIEF DESCRIPTION OF DRAWINGS

FIGS. 13A and 13B depict diagrams describing the detection mode and a communication mode.

FIG. 14 is a flowchart describing an example of operation of the communication apparatus 100, an initiator, and the communication apparatus 200, a target.

FIGS. 15A and 15B depict diagrams describing switching between the operation modes in the case where different values are used as the detection mode threshold and the communication mode threshold.

FIG. 16 is a diagram describing another example of switching between the operation modes.

DESCRIPTION OF EMBODIMENTS

<Embodiment of the Communication System to which the Present Technology is Applied>

Figure 1:
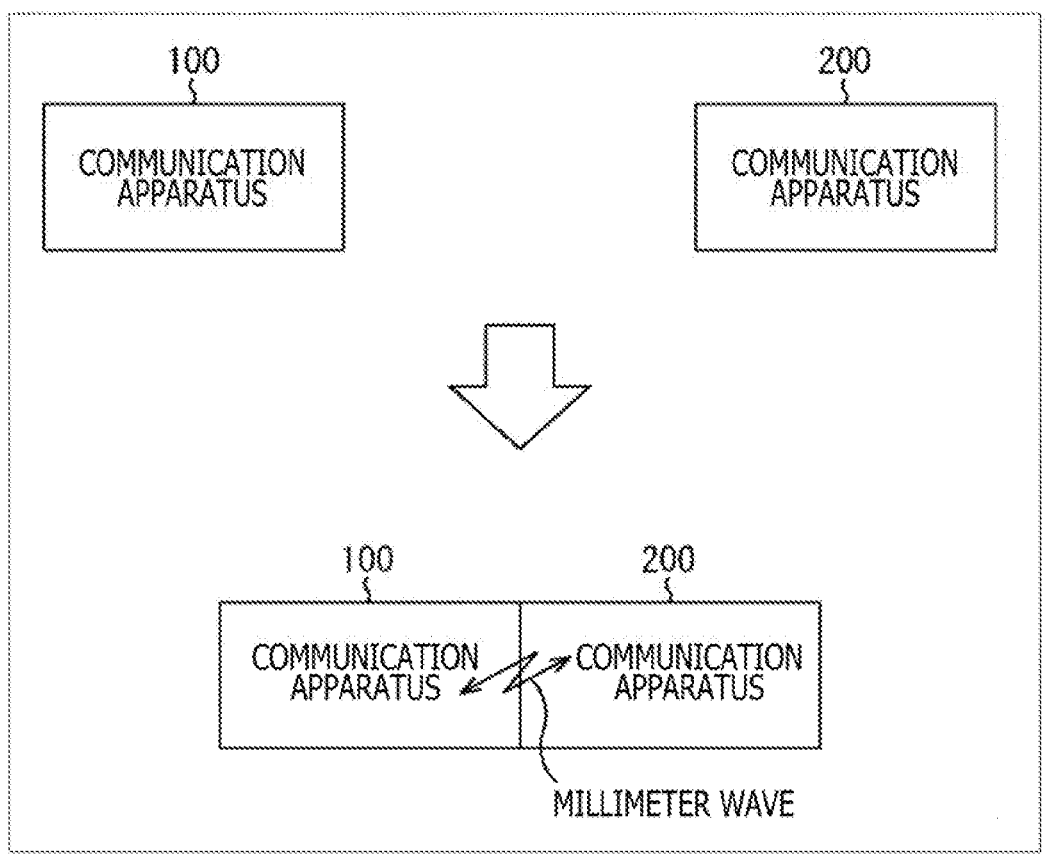
FIG. 1 is a block diagram illustrating a configuration example of an embodiment of a communication system to which the present technology is applied.

FIG. 1 is a block diagram illustrating a configuration example of an embodiment of a communication system to which the present technology is applied.

In FIG. 1, the communication system has communication apparatuses 100 and 200.

The communication apparatuses 100 and 200 are communication apparatuses for millimeter wave communication that send and receive data by modulating the data, for example, into a millimeter wave band signal (millimeter wave), and the communication apparatuses 100 and 200 exchange data by sending and receiving a modulated signal (high frequency signal) acquired by modulating data into a millimeter wave band.

Here, a millimeter wave ((modulated) signal in the millimeter wave band) refers to a signal whose frequency spans approximately from 30 to 300 GHz, i.e., whose wavelength spans approximately from 1 to 10 mm. According to a millimeter wave band signal, it is possible to transport data at a high data rate (high rate) thanks to its high frequency. For example, a millimeter wave band carrier at approximately 60 GHz permits transmission and reception of data approximately at the rate of 11 Gbps. Also, according to a millimeter wave band signal, it is possible to achieve communication using a variety of kinds of transport channels. That is, according to a millimeter wave band signal, it is possible to achieve communication whose transport channel is a space such as free space (wireless communication) using small antennas. Also, according to a millimeter wave band signal, it is possible to achieve communication whose transport channel is a metallic wire or communication whose transport channel is a dielectric such as plastic.

In the communication system illustrated in FIG. 1, transmission and reception of a millimeter wave band modulated signal takes place between the communication apparatuses 100 and 200 without wireless license and while complying with laws regulating radio wave.

Specifically, in the communication system illustrated in FIG. 1, transmission and reception of a millimeter wave band modulated signal takes place between the communication apparatuses 100 and 200 in the case where the communication apparatuses 100 and 200 are (nearly) in contact with each other, i.e., in the case where radio wave leakage outside the communication apparatuses 100 and 200 does not occur (hardly occurs) in such a manner as to ensure (approximate) freedom from radio wave leakage causing external leakage of modulated signal radio wave.

<First Configuration Example of the Communication Apparatuses 100 and 200>

Figure 2:
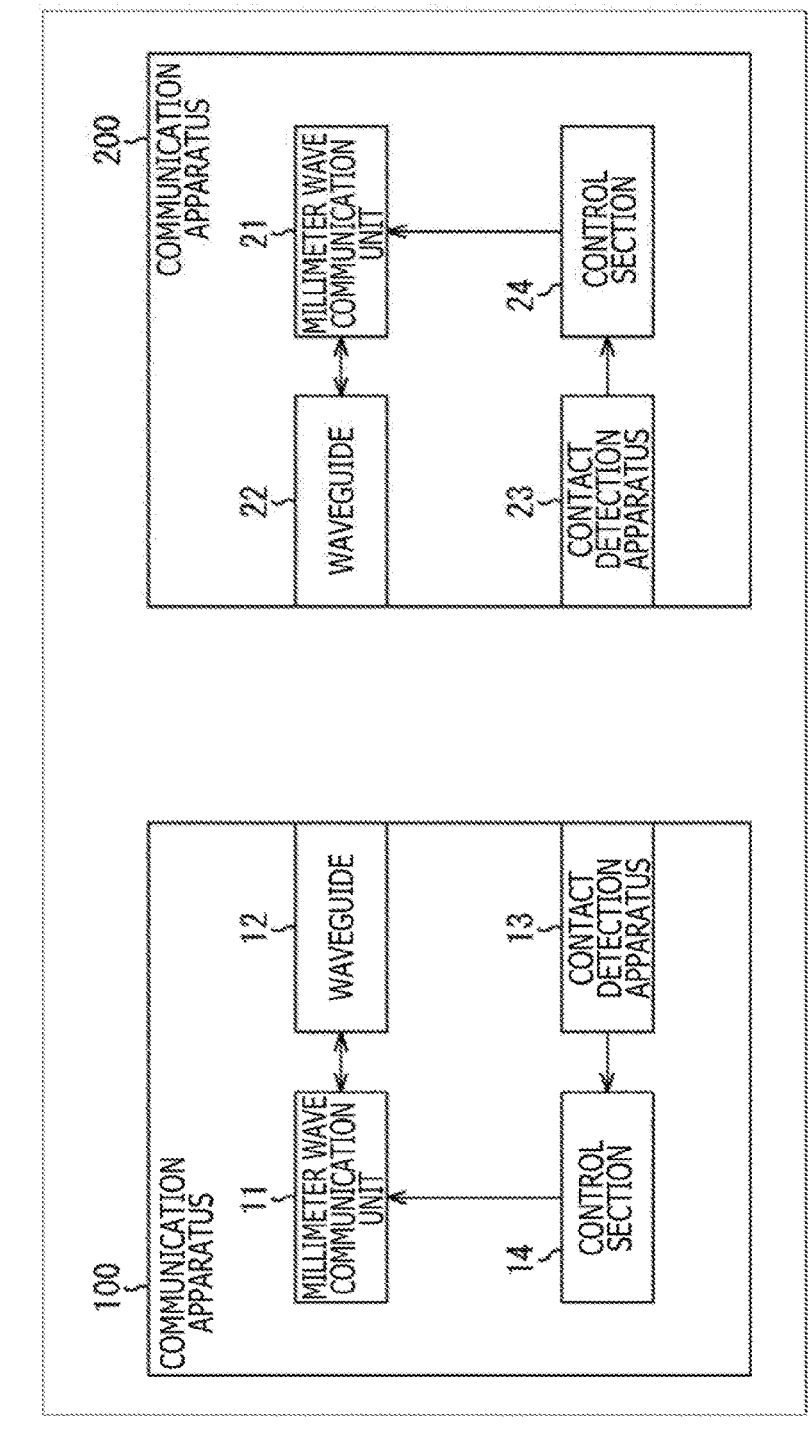
FIG. 2 is a block diagram illustrating a first configuration example of communication apparatuses 100 and 200.

FIG. 2 is a block diagram illustrating a first configuration example of the communication apparatuses 100 and 200 illustrated in FIG. 1.

In FIG. 2, the communication apparatus 100 has a millimeter wave communication unit 11, a waveguide 12, a contact detection apparatus 13, and a control section 14.

The millimeter wave communication unit 11 converts, in frequency, a baseband signal, target data to be sent (modulates the baseband signal), into a millimeter wave band modulated signal and sends the modulated signal to the waveguide 12.

Also, the millimeter wave communication unit 11 receives the millimeter wave band modulated signal sent from the communication apparatus 200 via the waveguide 12, i.e., the modulated signal that has propagated through the waveguide 12, converts, in frequency, the signal (demodulates the signal) into a baseband signal, and outputs the baseband signal.

The waveguide 12 includes, for example, a dielectric such as plastic. The waveguide 12 is in the shape of a long narrow plate. An end face thereof at one longitudinal end is connected to the millimeter wave communication unit 11, and an end face at the other end is exposed on the outside of the communication apparatus 100 (e.g., on a housing surface).

The contact detection apparatus 13 detects whether the communication apparatus 100 and the communication apparatus 200 (or other communication apparatus capable of millimeter wave communication) are in contact with each other.

That is, the contact detection apparatus 13 performs contact detection to determine whether the waveguide 12 of the communication apparatus 100 and a waveguide 22 of the communication apparatus 200 which will be described later (whether the end faces thereof) are in contact with each other and supplies the detection result of the contact detection to the control section 14.

The control section 14 controls the millimeter wave communication unit 11 in response to the detection result of the contact detection from the contact detection apparatus 13 and so on.

For example, in the case where the detection result of the contact detection indicates that the communication apparatus 100 and the communication apparatus 200 are in contact with each other, the control section 14 controls the millimeter wave communication unit 11 to send a millimeter wave band signal (modulated signal or carrier) from the millimeter wave communication unit 11.

Also, for example, in the case where the detection result of the contact detection does not indicate that the communication apparatus 100 and the communication apparatus 200 are in contact with each other, the control section 14 controls the millimeter wave communication unit 11 to limit (inhibit) the transmission of a millimeter wave band signal from the millimeter wave communication unit 11.

In FIG. 2, the communication apparatus 200 has a millimeter wave communication unit 21, a waveguide 22, a contact detection apparatus 23, and a control section 24. The millimeter wave communication unit 21 through the control section 24 are configured similarly to the millimeter wave communication unit 11 through the control section 14, respectively. Therefore, the description thereof will be omitted.

Here, among examples of detection methods used with the contact detection apparatuses 13 and 23 are a method using pressure-sensitive conductive rubber, a method detecting capacitive change, a method detecting deformation caused by blocking of light, a method detecting an optical touch image, a method detecting continuity or discontinuity, a method using an acoustic resonance tactile element, and a method detecting contact resistance change.

In the communication system thus configured, when the contact detection apparatus 13 detects contact between the waveguide 12 of the communication apparatus 100 and the waveguide 22 of the communication apparatus 200 in the communication apparatus 100, the control section 14 causes the millimeter wave communication unit 11 to send a millimeter wave band modulated signal as necessary.

That is, the millimeter wave communication unit 11 converts, in frequency, a baseband signal from a circuit that is not depicted into a millimeter wave band modulated signal and sends the signal.

The modulated signal sent from the millimeter wave communication unit 11 propagates through the waveguide 12 and further through the waveguide 22 of the communication apparatus 200 that is in contact with the waveguide 12 and is received by the millimeter wave communication unit 21.

The millimeter wave communication unit 21 converts, in frequency, the modulated signal received via the waveguide 22 (modulated signal that has propagated through the waveguide 22) into a baseband signal and supplies the signal to a circuit that is not depicted.

In the communication apparatus 200, on the other hand, when the contact detection apparatus 23 detects contact between the waveguide 12 of the communication apparatus 100 and the waveguide 22 of the communication apparatus 200, the control section 24 causes the millimeter wave communication unit 21 to send a millimeter wave band modulated signal as necessary.

That is, the millimeter wave communication unit 21 converts, in frequency, a baseband signal from a circuit that is not depicted into a millimeter wave band modulated signal and sends the signal.

The modulated signal sent from the millimeter wave communication unit 21 propagates through the waveguide 22 and further through the waveguide 12 of the communication apparatus 100 that is in contact with the waveguide 22 and received by the millimeter wave communication unit 11.

The millimeter wave communication unit 11 converts, in frequency, the modulated signal received via the waveguide 22 into a baseband signal and supplies the signal to a circuit that is not depicted.

It should be noted that in the case where contact between the waveguide 12 of the communication apparatus 100 and the waveguide 22 of the communication apparatus 200 is not detected by the contact detection apparatus 13 of the communication apparatus 100, the control section 14 limits the transmission of a millimeter wave band signal from the millimeter wave communication unit 11.

Similarly, in the case where contact between the waveguide 12 of the communication apparatus 100 and the waveguide 22 of the communication apparatus 200 is not detected by the contact detection apparatus 23 of the communication apparatus 200, the control section 24 limits the transmission of a millimeter wave band signal from the millimeter wave communication unit 21.

Thus, in the case where contact between the waveguide 12 of the communication apparatus 100 and the waveguide 22 of the communication apparatus 200 is not detected, the transmission of millimeter wave band signals from the millimeter wave communication units 11 and 21 is limited. This makes it possible to prevent radiation of a high-level or wide-band signal that may violate laws from the externally exposed end face of the waveguide 12 of the communication apparatus 100 or from the externally exposed end face of the waveguide 22 of the communication apparatus 200.

Incidentally, in the first configuration example of the communication apparatuses 100 and 200 illustrated in FIG. 2, it is necessary to provide the contact detection apparatuses 13 and 23 for detection of contact between the communication apparatus 100 (waveguide 12 thereof) and the communication apparatus 200 (waveguide 22 thereof), possibly resulting in upsizing and increased cost.

<Second Configuration Example of the Communication Apparatuses 100 and 200>

Figure 3:
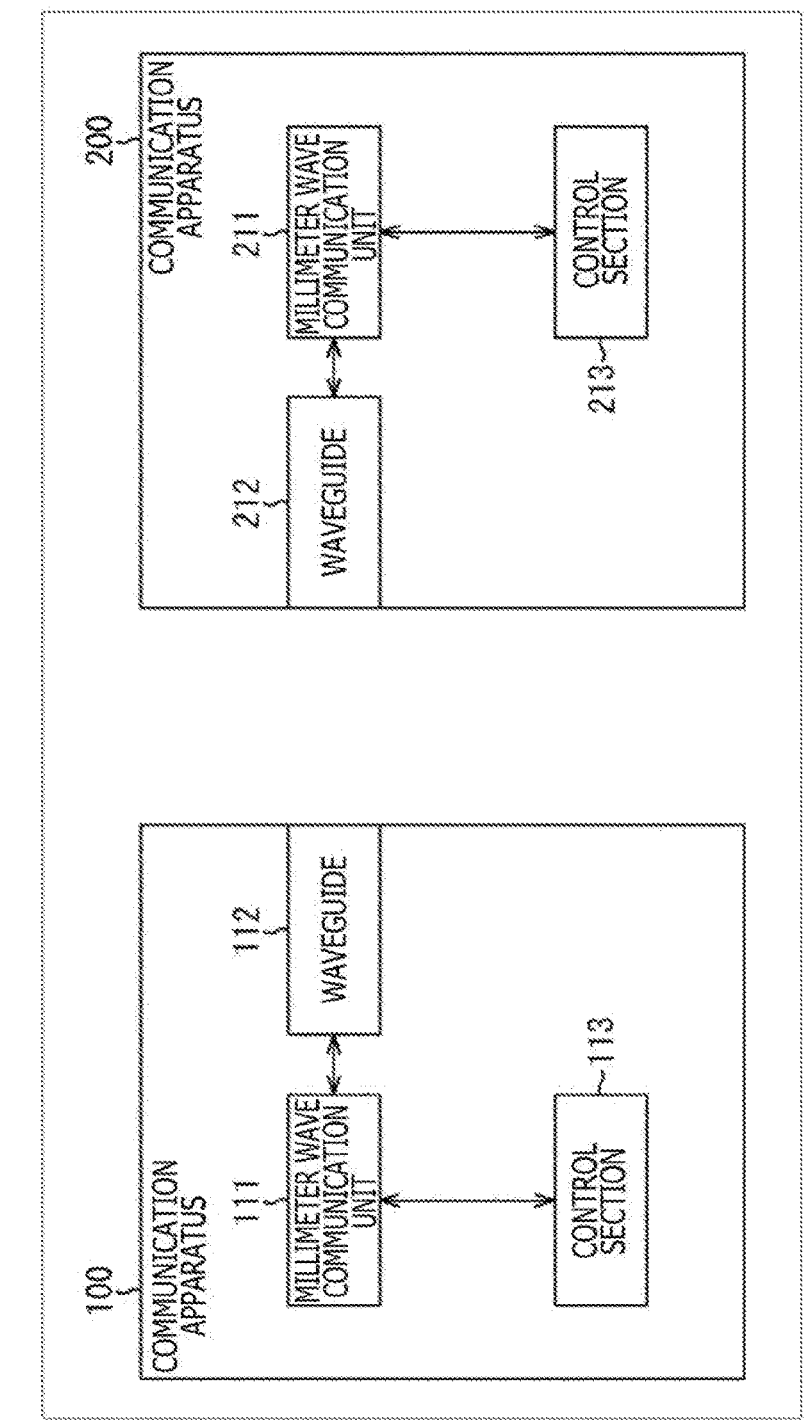
FIG. 3 is a block diagram illustrating a second configuration example of the communication apparatuses 100 and 200.

FIG. 3 is a block diagram illustrating a second configuration example of the communication apparatuses 100 and 200 illustrated in FIG. 1.

In FIG. 3, the communication apparatus 100 has a millimeter wave communication unit 111, a waveguide 112, and a control section 113.

The millimeter wave communication unit 111 converts, in frequency, a baseband signal, target data to be sent (modulates the baseband signal), into a millimeter wave band modulated signal and sends the modulated signal to the waveguide 112.

Also, the millimeter wave communication unit 111 receives the millimeter wave band modulated signal sent via the waveguide 112, i.e., the modulated signal that has propagated through the waveguide 112, converts, in frequency, the signal (demodulates the signal) into a baseband signal, and outputs the baseband signal.

The waveguide 112 includes, for example, a piece of hollow metal filled inside with a dielectric such as plastic. The waveguide 112 is in the shape of a long narrow plate. An end face thereof at one longitudinal end is connected to the millimeter wave communication unit 111, and an end face at the other end is exposed on the outside of the communication apparatus 100 (e.g., on a housing surface).

A millimeter wave band signal sent by the millimeter wave transmitter 111 propagates through the waveguide 112. Further, a millimeter wave band signal to be received by the millimeter wave transmitter 111 propagates through the waveguide 112.

The control section 113 controls the millimeter wave communication unit 111 in response to the millimeter wave band signal received by the millimeter wave communication unit 111 via the waveguide 112 and so on.

That is, the millimeter wave communication unit 111 has a detection mode and a communication mode as operation modes.

In the detection mode, contact between the waveguide 112 of the communication apparatus 100 and the waveguide 212 of the communication apparatus 200 is detected. In the communication mode, millimeter wave band modulated signals, acquired through frequency conversion of baseband signals, are sent and received via the waveguide 112 and a waveguide 212 between the communication apparatuses 100 and 200.

The control section 113 sets the operation mode to the detection mode or the communication mode in response to the millimeter wave band signal received by the millimeter wave communication unit 111 via the waveguide 112 and so on.

In FIG. 3, the communication apparatus 200 has a millimeter wave communication unit 211, the waveguide 212, and a control section 213. The millimeter wave communication unit 211 through the control section 213 are configured similarly to the millimeter wave communication unit 111 through the control section 113, respectively. Therefore, the description thereof will be omitted.

<Configuration Example of the Millimeter Wave Communication Units 111 and 211 and the Waveguides 112 and 212>

Figure 4:
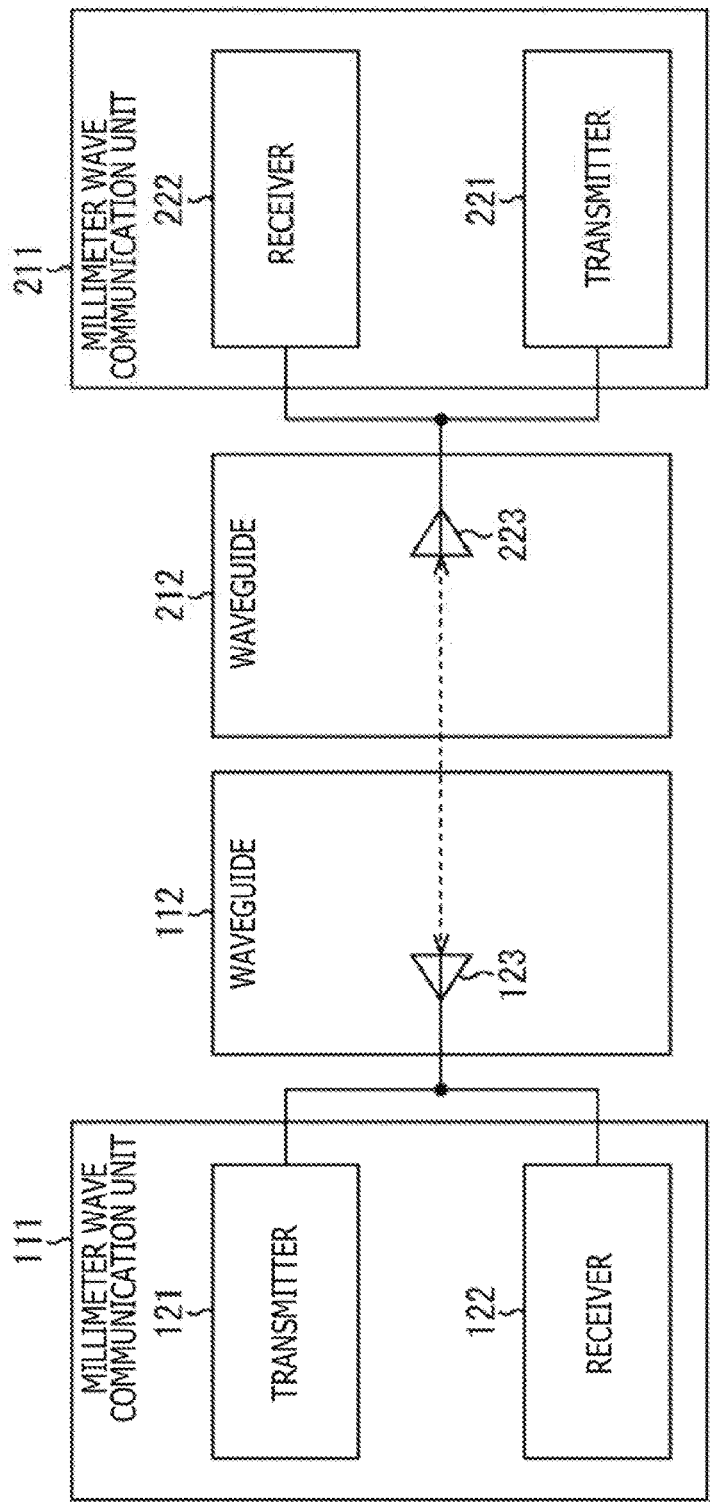
FIG. 4 is a diagram illustrating a configuration example of millimeter wave communication units 111 and 211 and waveguides 112 and 212.

FIG. 4 is a diagram illustrating a configuration example of the millimeter wave communication units 111 and 211 and the waveguides 112 and 212 illustrated in FIG. 3.

In FIG. 4, the millimeter wave communication unit 111 has a transmitter 121 and a receiver 122.

The transmitter 121 converts, in frequency, a baseband signal into a millimeter wave band modulated signal and sends the signal to the waveguides 112 from an antenna 123.

The receiver 122 receives the millimeter wave band modulated signal that has propagated through the waveguide 112 and that is supplied via the antenna 123 and converts, in frequency, the modulated signal into a baseband signal.

In FIG. 4, the antenna 123 is used for both transmission and reception and connected to the dielectric included in the waveguide 112.

In FIG. 4, the waveguide 112 includes a waveguide that is used for both transmission and reception in response to the fact that the antenna 123 is an antenna that is used for both transmission and reception.

That is, in FIG. 4, the waveguide 112 is a waveguide (first waveguide) on the side of the transmitter 121 through which a signal sent by the transmitter 121 propagates and is also a waveguide on the side of the receiver 122 through which a signal to be received by the receiver 122 propagates (will propagate).

The millimeter wave communication unit 211 has a transmitter 221 and a receiver 222.

The transmitter 221 and the receiver 222 are configured similarly to the transmitter 121 and the receiver 122, respectively.

That is, the transmitter 221 sends a millimeter wave band modulated signal to the waveguide 212 from an antenna 223 as does the transmitter 121.

The receiver 222 receives the millimeter wave band modulated signal that has propagated through the waveguide 212 and that is supplied via the antenna 223.

In FIG. 4, the antenna 223 is used for both transmission and reception and connected to the dielectric included in the waveguide 212 as is the antenna 123.

Further, in FIG. 4, the waveguide 212 includes a waveguide that is used for both transmission and reception in response to the fact that the antenna 223 is an antenna that is used for both transmission and reception.

That is, in FIG. 4, the waveguide 212 is a waveguide on the side of the transmitter 221 through which a signal sent by the transmitter 221 propagates and is also a waveguide (second waveguide) on the side of the receiver 222 through which a signal to be received by the receiver 222 propagates (will propagate).

In the case where the millimeter wave communication unit 111 has the transmitter 121 and the receiver 122, and the millimeter wave communication unit 211 has the transmitter 221 and the receiver 222 as illustrated in FIG. 4, the millimeter wave communication units 111 and 211 are capable of bidirectional communication.

That is, in the case where the waveguides 112 and 212 are (nearly) in contact with each other as illustrated in FIG. 4, a millimeter wave band modulated signal sent by the transmitter 121 in the millimeter wave communication unit 111 propagates from the antenna 123 through the waveguides 112 and 212 and is received by the receiver 222 via the antenna 223. Also, a millimeter wave band modulated signal sent by the transmitter 221 in the millimeter wave communication unit 211 propagates from the antenna 223 through the waveguides 212 and 112 and is received by the receiver 122 via the antenna 123.

It should be noted that in the case where millimeter wave signals in the same frequency band are used by the transmitters 121 and 221 in the communication system having the antennas 123 and 223 and the waveguides 112 and 212 that are used for both transmission and reception, the millimeter wave communication units 111 and 211 are capable of half-duplex communication. Also, in the case where millimeter wave signals of different frequency bands are used by the transmitters 121 and 221, the millimeter wave communication units 111 and 211 are capable of full-duplex communication.

Further, in the case where bidirectional communication is conducted in the communication system, that is, in the case where, for example, data is sent only unidirectionally from the millimeter wave communication unit 111 to the millimeter wave communication unit 211, the millimeter wave communication unit 111 can be configured without the receiver 122, and the millimeter wave communication unit 211 can be configured without the transmitter 221.

Figure 5:
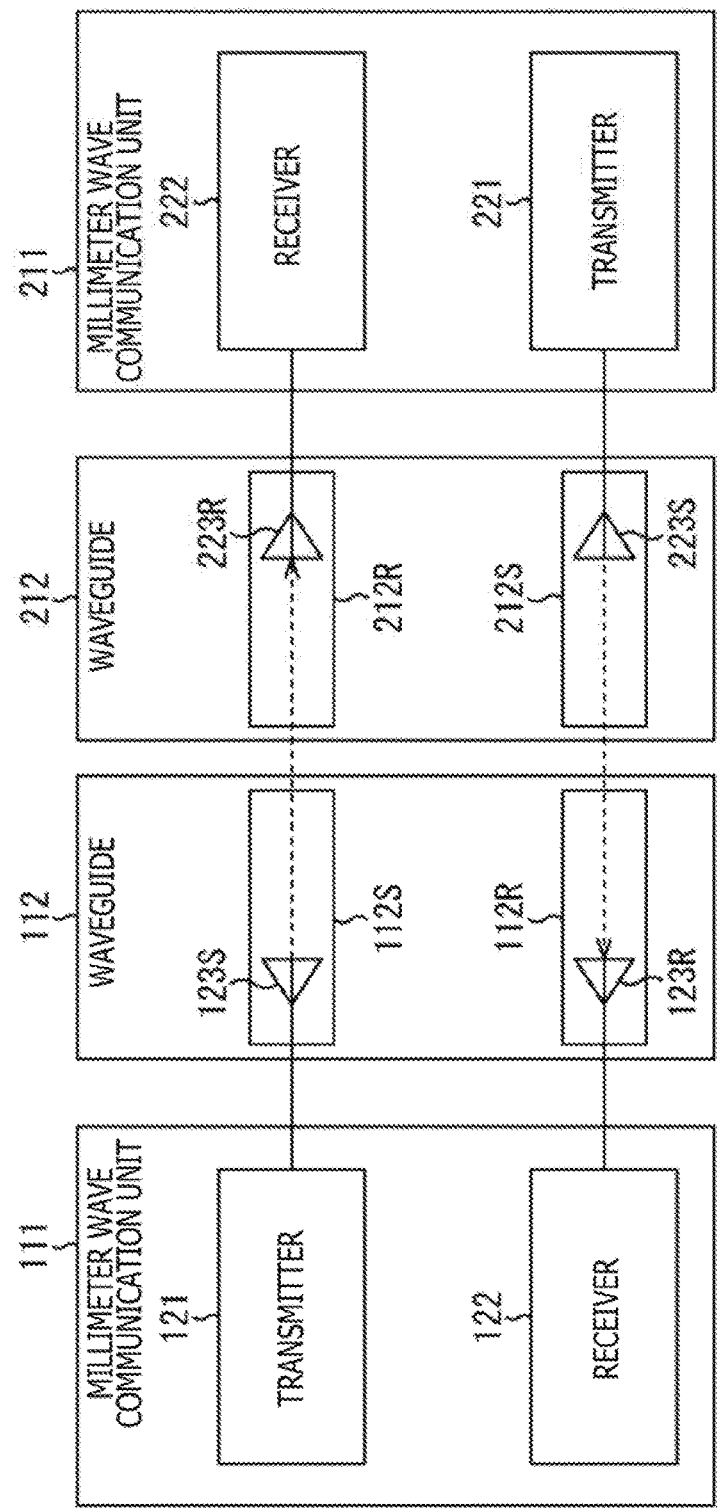
FIG. 5 is a diagram illustrating another configuration example of the millimeter wave communication units 111 and 211 and the waveguides 112 and 212.

FIG. 5 is a diagram illustrating another configuration example of the millimeter wave communication units 111 and 211 and the waveguides 112 and 212 illustrated in FIG. 3.

It should be noted that the portions corresponding to those in the case illustrated in FIG. 4 are denoted by the same reference numerals, and the description thereof will be omitted below as appropriate.

The case illustrated in FIG. 5 differs from the case illustrated in FIG. 4 in which the communication system has the antennas 123 and 223 and the waveguides 112 and 212 that are used for both transmission and reception in that the communication system has transmission antennas 123S and 223S, reception antennas 123R and 223R, transmission waveguides 112S and 212S, and reception waveguides 112R and 212R.

In FIG. 5, the waveguides 112 has the transmission waveguide 112S and the reception waveguide 112R. The waveguides 212 has the transmission waveguide 212S and the reception waveguide 212R.

Each of the waveguides 112S, 112R, 212S, and 212R includes, for example, a piece of hollow metal filled inside with a given dielectric.

Also, in FIG. 5, the waveguides 112 and 212 are configured such that when the millimeter wave communication units 111 and 112 are brought into contact with each other, the waveguides 112S and 212R come into contact with each other, and the waveguides 112R and 212S come into contact with each other.

The antenna 123S is a transmission antenna and connected to a dielectric included in the transmission waveguide 112S.

In FIG. 5, the millimeter wave band modulated signal sent by the transmitter 121 propagates from the antenna 123S through the waveguide 112S.

The antenna 123R is a reception antenna and connected to a dielectric included in the reception waveguide 112R.

The millimeter wave band modulated signal that propagates through the waveguide 112R is received by the receiver 122 via the antenna 123R.

The antenna 223S is a transmission antenna and connected to a dielectric included in the transmission waveguide 212S.

The millimeter wave band modulated signal sent by the transmitter 221 propagates from the antenna 223S through the waveguide 212S.

The antenna 223R is a reception antenna and connected to a dielectric included in the reception waveguide 212R.

The millimeter wave band modulated signal that propagates through the waveguide 212R is received by the receiver 222 via the antenna 223R.

From the above, in FIG. 5, the waveguide 112S is a waveguide (first waveguide) on the side of the transmitter 121 through which a signal sent by the transmitter 121 propagates and the waveguide 212R is also a waveguide (second waveguide) on the side of the receiver 222 through which a signal to be received by the receiver 222 propagates (will propagate).

Also, the waveguide 212S is a waveguide on the side of the transmitter 221 through which a signal sent by the transmitter 221 propagates and the waveguide 112R is also a waveguide on the side of the receiver 122 through which a signal to be received by the receiver 122 propagates (will propagate).

In the case where the communication system has the transmission antennas 123S and 223S, the reception antennas 123R and 223R, the transmission waveguides 112S and 212S, and the reception waveguides 112R and 212R as illustrated in FIG. 5, the millimeter wave communication units 111 and 211 are capable of full-duplex communication.

That is, in the case where the waveguides 112S and 212R are in contact with each other, and the waveguides 112R and 212S are in contact with each other as illustrated in FIG. 5, a millimeter wave band modulated signal sent by the transmitter 121 propagates from the antenna 123S through the waveguides 112S and 212R and is received by the receiver 222 via the antenna 223R. Also, a millimeter wave band modulated signal sent by the transmitter 221 propagates from the antenna 223S through the waveguides 212S and 112R and is received by the receiver 122 via the antenna 123R.

Here, the present technology is applicable not only in the case where each of the waveguides 112 and 212 includes a waveguide that is used for both transmission and reception as illustrated in FIG. 4 but also in the case where the waveguide 112 has the transmission waveguide 112S and the reception waveguide 112R and the waveguide 212 has the transmission waveguide 212S and the reception waveguide 212R as illustrated in FIG. 5.

It should be noted, however, that we assume, for example, in the description given below, that each of the waveguides 112 and 212 includes a waveguide that is used for both transmission and reception for easier description, as illustrated in FIG. 4.

<Configuration Example of the Transmitter 121 and the Receiver 122 and the Transmitter 221 and the Receiver 222>

Figure 6:
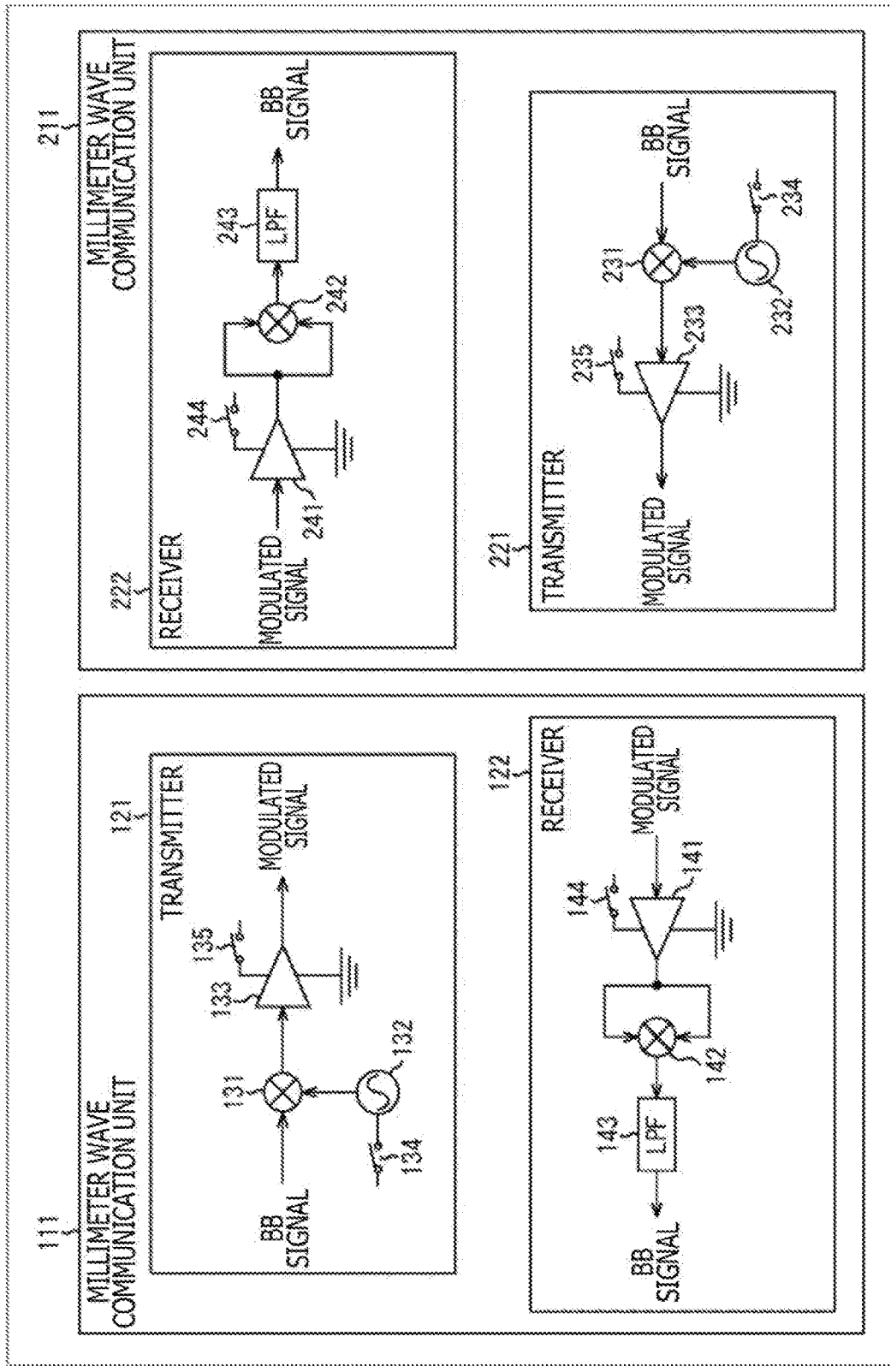
FIG. 6 is a diagram illustrating a configuration example of a transmitter 121 and a receiver 122 of the millimeter wave communication unit 111 and a transmitter 221 and a receiver 222 of the millimeter wave communication unit 211.

FIG. 6 is a diagram illustrating a configuration example of the transmitter 121 and the receiver 122 of the millimeter wave communication unit 111 and the transmitter 221 and the receiver 222 of the millimeter wave communication unit 211.

The transmitter 121 has a mixer 131, an oscillator 132, an amplifier 133, and switches 134 and 135.

The mixer 131 is supplied with a baseband signal (BB signal) from a circuit that is not depicted and a millimeter wave band carrier from the oscillator 132.

The mixer 131 converts, in frequency, a baseband signal using a carrier from the oscillator 132 (modulates the carrier in accordance with the baseband signal) by mixing (multiplying) the baseband signal and the carrier from the oscillator 132 and supplies a millimeter wave band modulated signal such as amplitude-modulated (ASK (Amplitude Shift Keying)) signal, acquired as a result thereof, to the amplifier 133.

Alternatively, the mixer 133 supplies the carrier from the oscillator 132 to the amplifier 133 in an 'as-is' condition.

The oscillator 132 generates, for example, a millimeter wave band such as 56 GHz through oscillation and supplies the carrier to the mixer 131.

The amplifier 133 amplifies the signal (modulated signal or carrier) from the mixer 131 with a given gain as necessary and outputs the amplified signal. The signal output from the amplifier 133 is sent to the waveguide 112 (from the antenna 123 (FIG. 4)).

It should be noted that the gain of the amplifier 133 (degree of amplification of the signal from the mixer 133) can be specified in accordance with control performed by the control section 113 (FIG. 3).

The switches 134 and 135 turn ON or OFF in accordance with control performed by the control section 113 (FIG. 3).

When the switch 134 turns ON or OFF, the oscillator 132 turns ON or OFF.

When the switch 135 turns ON or OFF, the amplifier 133 turns ON or OFF.

The receiver 222 has an amplifier 241, a mixer 242, an LPF (Low Pass Filter) 243, and a switch 244.

The amplifier 241 receives a millimeter wave band signal (modulated signal or carrier) that has propagated through the waveguide 212, amplifies the signal with a given gain as necessary, and supplies the amplified signal to the mixer 242.

It should be noted that the band (reception band) of the millimeter wave band signal amplified by the amplifier 241 can be specified in accordance with control performed by the control section 213 (FIG. 3).

The mixer 242 converts, in frequency, the millimeter wave band modulated signal from the amplifier 241 into a baseband signal (demodulates the modulated signal into a baseband signal) by performing squared detection that mixes the millimeter wave band modulated signal supplied from the amplifier 241 with itself (squares the modulated signal), and supplies the baseband signal to the LPF 243.

The LPF 243 performs filtering that passes a low-frequency component of the signal from the mixer 243 and outputs a baseband signal acquired as a result of the filtering.

It should be noted that the pass band of the LPF 243 can be specified in accordance with control performed by the control section 213.

The switch 244 turns ON or OFF in accordance with control performed by the control section 213.

When the switch 244 turns ON or OFF, the amplifier 241 turns ON or OFF.

Although we assume here in FIG. 6 that the receiver 222 converts, in frequency, the millimeter wave band modulated signal into a baseband signal through squared detection, it is possible for the receiver 222 to convert, in frequency, the millimeter wave band modulated signal into a baseband signal through detection other than squared detection such as synchronous detection that reproduces a carrier and mixes the carrier and a modulated signal.

The transmitter 221 has a mixer 231, an oscillator 232, an amplifier 233, and switches 234 and 235.

The mixer 231 through the switch 235 are configured similarly to the mixer 131 through the switch 135 of the transmitter 121, respectively. Therefore, the description thereof will be omitted.

The receiver 122 has an amplifier 141, a mixer 142, an LPF 143, and a switch 144.

The amplifier 141 through the switch 144 are configured similarly to the amplifier 241 through the switch 244 of the receiver 222, respectively. Therefore, the description thereof will be omitted.

<Operation Modes of the Millimeter Wave Communication Units 111 and 211>

Figure 7:
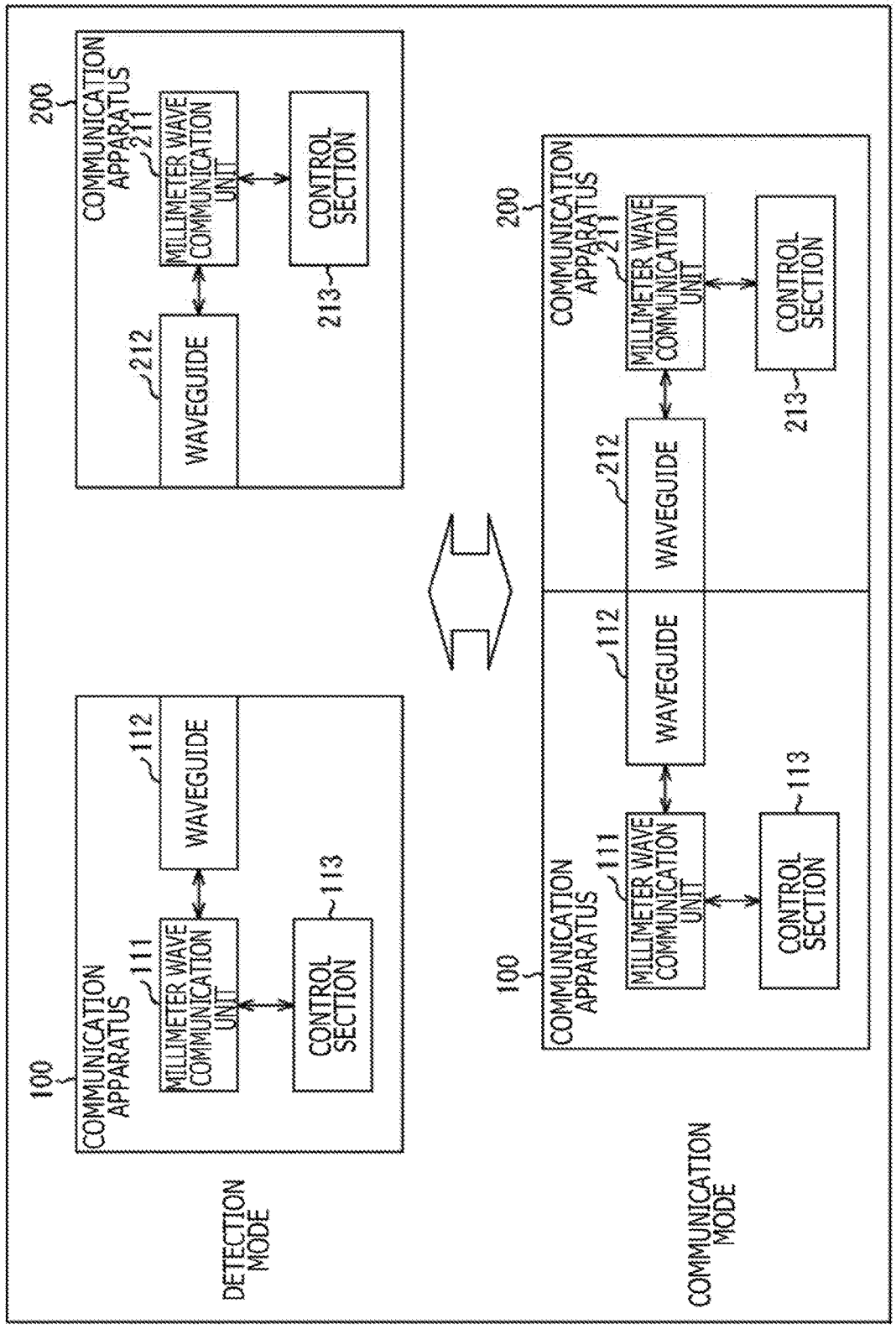
FIG. 7 is a diagram describing operation modes of the millimeter wave communication units 111 and 211.

FIG. 7 is a diagram describing operation modes of the millimeter wave communication units 111 and 211 illustrated in FIG. 3.

As described in FIG. 3, the millimeter wave communication units 111 and 211 have the detection mode and the communication mode as operation modes.

In the detection mode, contact between the waveguide 112 of the communication apparatus 100 and the waveguide 212 of the communication apparatus 200 is detected.

When the fact that the waveguide 112 of the communication apparatus 100 and the waveguide 212 of the communication apparatus 200 have (nearly) come into contact with each other is detected, the millimeter wave communication units 111 and 211 switch their operation mode from the detection mode to the communication mode.

In the communication mode, a millimeter wave band modulated signal is sent and received between the communication apparatuses 100 and 200 via the waveguides 112 and 212.

Figure 8:
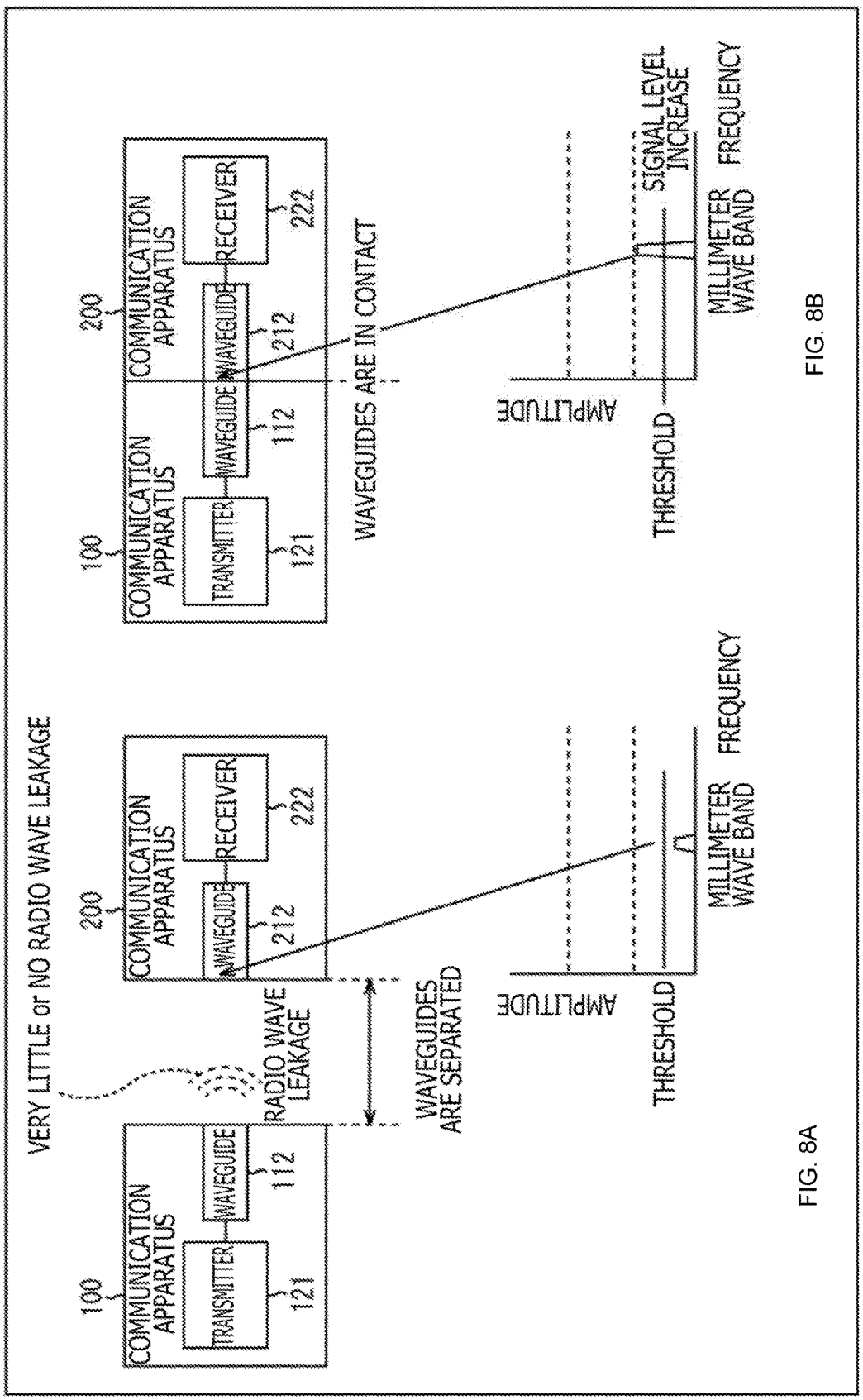
FIGS. 8A and 8B depict diagrams describing a detection mode.

FIGS. 8A and 8B depict diagrams describing the detection mode.

We assume here, for convenience of description, that, as for the communication apparatuses 100 and 200 (millimeter wave communication units 111 and 211) that exchange a baseband signal, one of the communication apparatuses makes a request to initiate communication and the other communication apparatus initiates communication in response to the request from one of the communication apparatuses.

Also, the communication apparatus (millimeter wave communication unit) that makes a request to initiate communication will be also referred to as an initiator, and the communication apparatus that initiates communication in response to the request from the initiator will be also referred to as a target.

A description will be given below by calling, for example, of the communication apparatuses 100 and 200 (millimeter wave communication units 111 and 211 thereof), the communication apparatus 100 (millimeter wave communication unit 111) an initiator and the communication apparatus 200 (millimeter wave communication unit 211) a target.

In the detection mode, the transmitter 121 of the communication apparatus 100, an initiator, sends a given signal to the waveguide 112 (from the antenna 123).

In the detection mode, as a given signal sent by the transmitter 121, a narrow-band low-level signal that is not only narrower in band but also lower in level than a millimeter wave band modulated signal sent in the communication mode, for example, can be used as a given signal sent in the detection mode.

As a narrow-band low-level signal, a low-level signal (also referred to as a low-level carrier) that is a millimeter wave band carrier output from the oscillator 132 (FIG. 6) and that is acquired by specifying, for the amplifier 133 (FIG. 6), a smaller gain than that for amplifying a millimeter wave band modulated signal sent in the communication mode, can be used.

Also, as a narrow-band low-level signal, a low-level signal (also referred to as a low-rate modulated signal) that is a modulated signal resulting from modulation of a millimeter wave band carrier with a baseband signal that is smaller in rate (narrower in band) than a baseband signal sent in the communication mode and that is acquired by specifying, for the amplifier 133, a smaller gain than that for amplifying a millimeter wave band modulated signal sent in the communication mode, can be used.

The narrow-band low-level signal sent by the transmitter 121 to the waveguide 112 in the detection mode propagates through the waveguide 112 and reaches the outer end face of the waveguide 112.

In the case where the communication apparatuses 100 and 200 are separated, the outer end face of the waveguide 112 is in contact with a space (e.g., atmosphere). As a result, nearly all the narrow-band low-level signal is reflected by the outer end face of the waveguide 112 because of the difference in dielectric constant. Therefore, there is little radio wave leakage of the narrow-band low-level signal from the outer end face of the waveguide 112.

Also, even if there is a radio wave leakage, the extent (intensity) of the radio wave leakage is slight. Further, because the narrow-band low-level signal is narrow in band and low in level, it does not cause radio wave emission of a high-level or wide-band signal that would violate laws as a radio wave leakage.

In the detection mode, there is little radio wave leakage of the narrow-band low-level signal from the outer end face of the waveguide 112 as described above. Therefore, in the case where the communication apparatuses 100 and 200 are separated, the narrow-band low-level signal does not reach the communication apparatus 200 from the communication apparatus 100, or even if it does, the narrow-band low-level signal that propagates through the waveguide 212 and is received by the receiver 222 turns out to be extremely small in level.

FIG. 8A illustrates an example of a level of a narrow-band low-level signal received by the receiver 222 of the communication apparatus 200 in the case where the communication apparatuses 100 and 200 are separated.

In FIG. 8A, a narrow-band low-level signal smaller in level than a predetermined detection mode threshold is received by the receiver 222.

On the other hand, in the case where the waveguide 112 of the communication apparatus 100 and the waveguide 212 of the communication apparatus 200 are in contact with each other (including the case where they are close to such an extent that they are considered being in contact), the narrow-band low-level signal sent by the transmitter 121 propagates through the waveguides 112 and 212 and reaches and is received by the receiver 222 while maintaining its level to some extent.

That is, in the case where the waveguides 112 and 212 are in contact with each other, the level of the narrow-band low-level signal received by the receiver 222 via the waveguide 212 increases significantly from the level of the narrow-band low-level signal received by the receiver 222 via the waveguide 212 in the case where the waveguides 112 and 212 are not in contact with each other (in the case where the communication apparatuses 100 and 200 are separated).

FIG. 8B illustrates an example of a level of a narrow-band low-level signal received by the receiver 222 of the communication apparatus 200 in the case where the waveguide 112 of the communication apparatus 100 and the waveguide 212 of the communication apparatus 200 are separated.

In FIG. 8B, a narrow-band low-level signal equal to or greater in level than a predetermined detection mode threshold is received by the receiver 222.

In the communication apparatuses 100 and 200, the control sections 113 and 213 (FIG. 3) specify an operation mode in response to the narrow-band low-level signal received by the receiver 222 of the communication apparatus 200, a target, via the waveguide 212.

That is, in the case where the level of the narrow-band low-level signal received by the receiver 222 via the waveguide 212 is equal to or larger in level than a predetermined detection mode threshold in the detection mode, the control sections 113 and 213 switch the operation mode from the detection mode to the communication mode by determining that contact between the waveguides 112 and 212 has been detected.

As a result, the operation mode of the transmitter 121 (communication apparatus 100 having the transmitter 121) and the operation mode of the receiver 222 (communication apparatus 200 having the receiver 222) are switched from the detection mode to the communication mode.

In the communication mode, a predetermined high-rate baseband signal is converted, in frequency, to a millimeter wave band modulated signal with a carrier in the transmitter 121. Further, in the transmitter 121, the modulated signal is amplified with a given high gain by the amplifier 133, and a modulated signal larger in level and larger in frequency band than the narrow-band low-level signal is sent.

The modulated signal sent by the transmitter 121 propagates through the waveguides 112 and 212 that are in contact with each other and reaches and is received by the receiver 222 while maintaining its level to some extent.

The modulated signal that is sent by the transmitter 121 and propagates through the waveguides 112 and 212 in the communication mode is a signal larger in level and larger in frequency band than the narrow-band low-level signal. However, the waveguides 112 and 212 are in contact with each other. Therefore, radio wave leakage of the modulated signal as a radio wave does not occur.

Therefore, it is possible to prevent radio wave leakage causing leakage of a high-level modulated signal or a wide-band modulated signal, allowing for compliance with laws regulating radio wave.

It should be noted that the level of the narrow-band low-level signal sent by the transmitter 121 in the detection mode and the threshold for the detection mode are adjusted in advance to ensure that radio wave leakage in the case of separation between the communication apparatuses 100 and 200 complies with laws regulating radio wave, that the level of the narrow-band low-level signal received by the receiver 222 in the case of separation between the communication apparatuses 100 and 200 is smaller than the detection mode threshold, and that the level of the narrow-band low-level signal received by the receiver 222 in the case of contact between the waveguides 112 and 212 is equal to or larger than the detection mode threshold.

Figure 9:
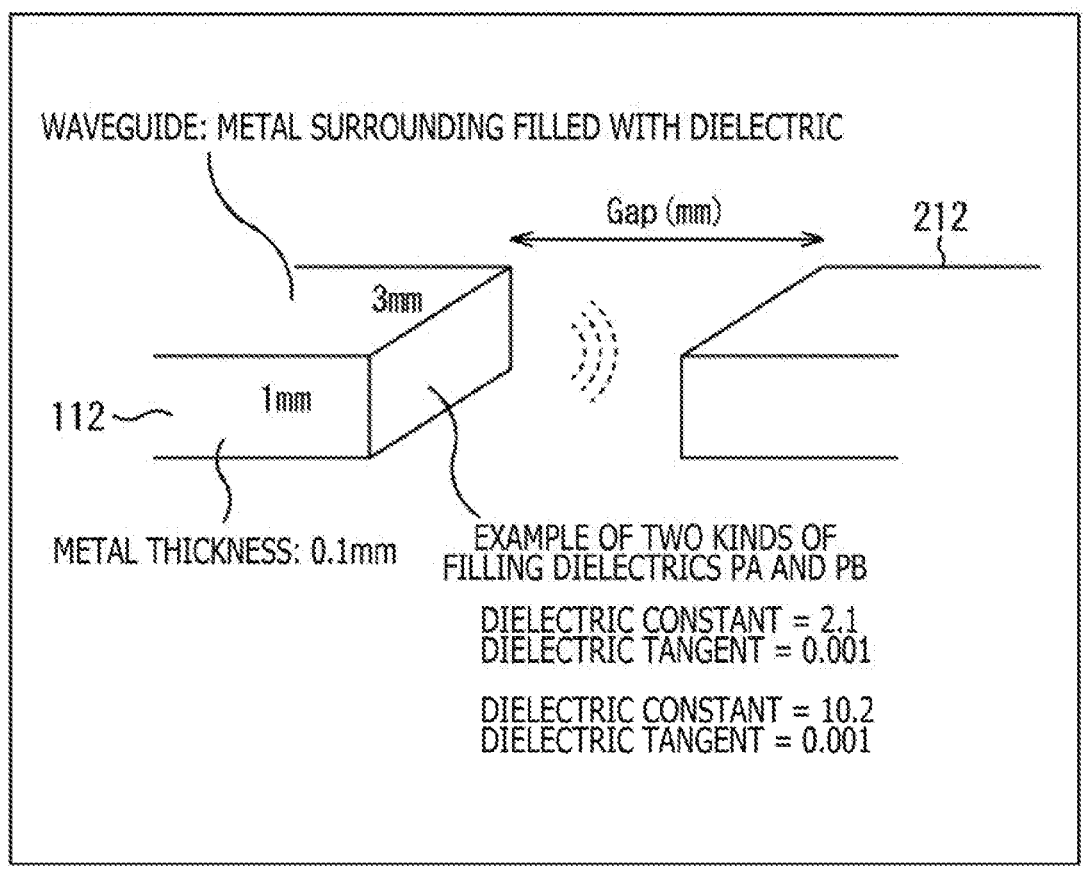
FIG. 9 is a diagram describing first simulation for investigating a relationship between a waveguide-to-waveguide gap and a waveguide-to-waveguide transfer characteristic.

FIG. 9 is a diagram describing first simulation for investigating a relationship between a waveguide-to-waveguide gap and waveguide-to-waveguide transfer characteristic.

In the first simulation, waveguides in the shape of a long narrow plate having a rectangular cross section were used as the waveguides 112 and 212.

The waveguides 112 and 212 are surrounded by a piece of metal on the four surfaces orthogonal to the cross section and filled with dielectrics.

The cross sections of the waveguides 112 and 212 measure 3 mm across and 1 mm down, with the metal of the four surfaces orthogonal to the cross sections being 0.1 mm thick.

Also, in the first simulation, two kinds of dielectrics PA and PB were made available as dielectrics filled into the waveguides 112 and 212.

A dielectric having a dielectric constant of 2.1 and a dielectric tangent of 0.001 (Teflon (registered trademark)) is used as the dielectric PA, and a dielectric having a dielectric constant of 10.2 and a dielectric tangent of 0.001 is used as the dielectric PB.

In the first simulation, the waveguides 112 and 212 were arranged such that their end faces were opposed to each other, and the gap between the end faces was set to a variety of distances so as to measure an S-parameter transfer coefficient S21 from the waveguide 112 to the waveguide 212.

It should be noted that, in the first simulation, a 60 GHz carrier was used for measurement of the transfer coefficient S21.

Figure 10:
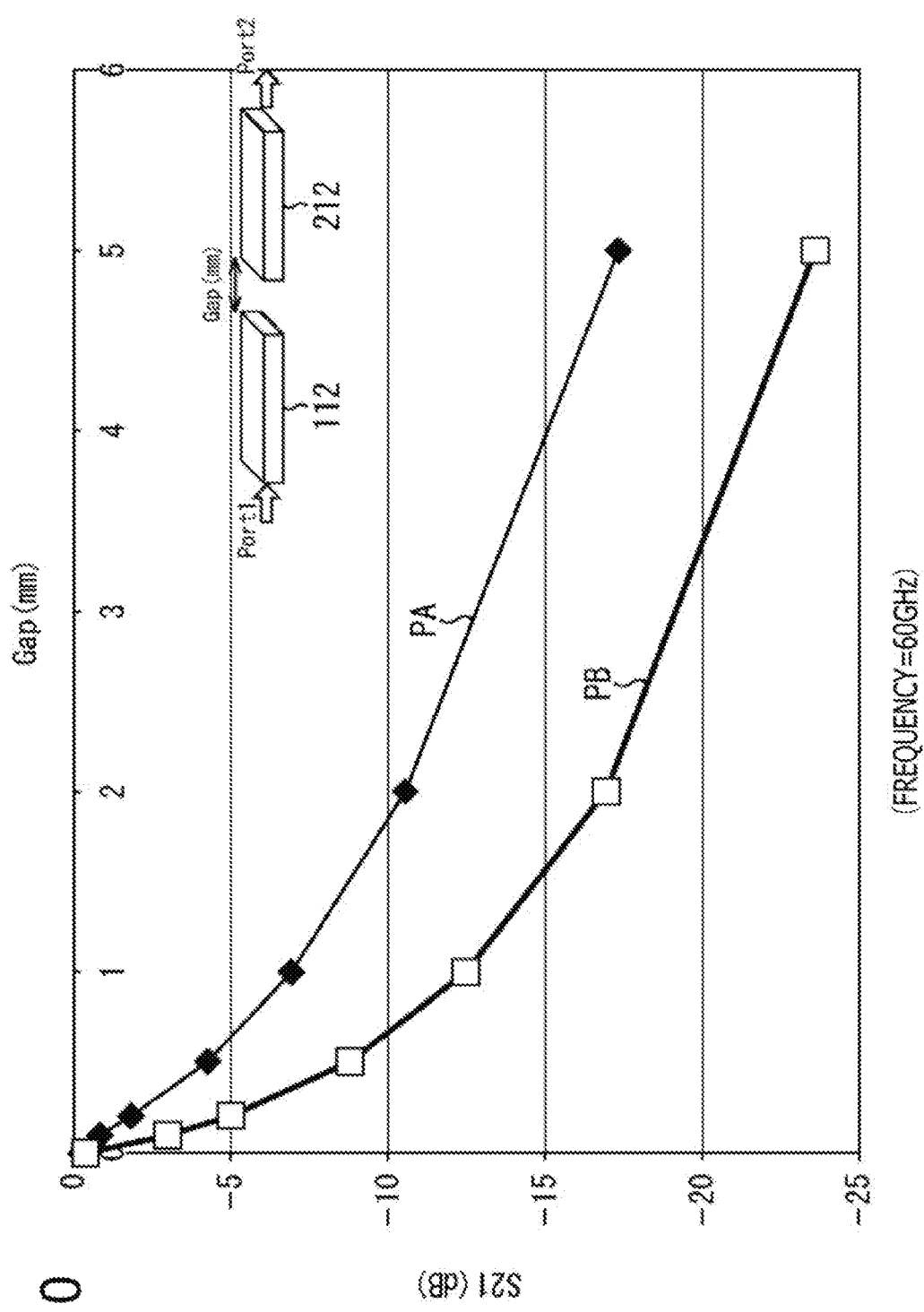
FIG. 10 is a diagram illustrating simulation results of the first simulation.

FIG. 10 is a diagram illustrating results of the first simulation described in FIG. 9.

That is, FIG. 10 illustrates a relationship between the waveguide-to-waveguide gap 112 and 212 and the transfer coefficient S21 from the waveguide 112 to the waveguide 212 acquired by the first simulation.

According to the results of the simulation illustrated in FIG. 10, it can be confirmed that when the distance of the gap between the end faces of the waveguides 112 and 212 changes from a 0 to a non-0 state, that is, when the waveguides 112 and 212 are separated slightly from a contact state, the transfer coefficient S21 declines sharply.

Further, according to the simulation results, it can be confirmed that the transfer coefficient S21 declines more sharply in the case where the dielectric PB is used than in the case where the dielectric PA is used.

Further, the extent of change (decline) in the transfer coefficient S21 when the distance of the gap between the end faces of the waveguides 112 and 212 changes from a 0 state to a non-0 state can be adjusted not only by the dielectric filled into (the dielectric constant of) the waveguides 112 and 212 but also by the shape of the end faces of the waveguides 112 and 212.

Figure 11:
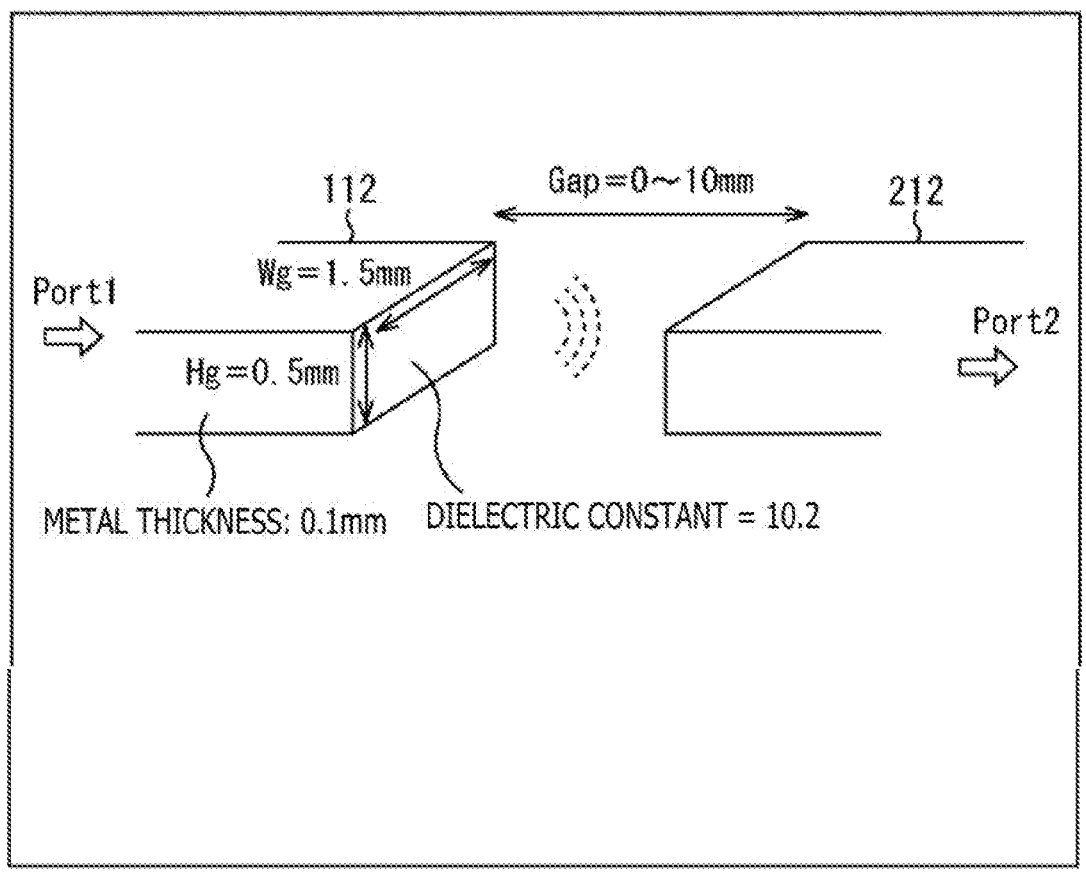
FIG. 11 is a diagram describing second simulation for investigating the relationship between the waveguide-to-waveguide gap and the waveguide-to-waveguide transfer characteristic.

FIG. 11 is a diagram describing second simulation for investigating the relationship between the waveguide-to-waveguide gap and the waveguide-to-waveguide transfer characteristic.

In the second simulation, waveguides having a cross section in the shape of a rectangular and long narrow plate, surrounded by a piece of metal on the four surfaces orthogonal to the cross section, and filled with dielectrics are used as the waveguides 112 and 212 as in the first simulation.

It should be noted, however, that, in the second simulation, the cross sections of the waveguides 112 and 212 measure 1.5 mm across and 0.5 mm down (Wg×Hg), with the metal of the four surfaces orthogonal to the cross sections being 0.1 mm thick.

Also, in the second simulation, the dielectric PB described in FIG. 9 was used as a dielectric filled into the waveguides 112 and 212.

As described in FIG. 9, the dielectric PB has a dielectric constant of 10.2 and a dielectric tangent of 0.001.

In the second simulation, the waveguides 112 and 212 were arranged such that their end faces were opposed to each other, and the gap between the end faces was set to a variety of distances so as to measure the S-parameter transfer coefficient S21 from the waveguide 112 to the waveguide 212 as in the first simulation.

It should be noted that, in the second simulation, carriers from 30 to 90 GHz were used for measurement of the transfer coefficient S21.

Figure 12:
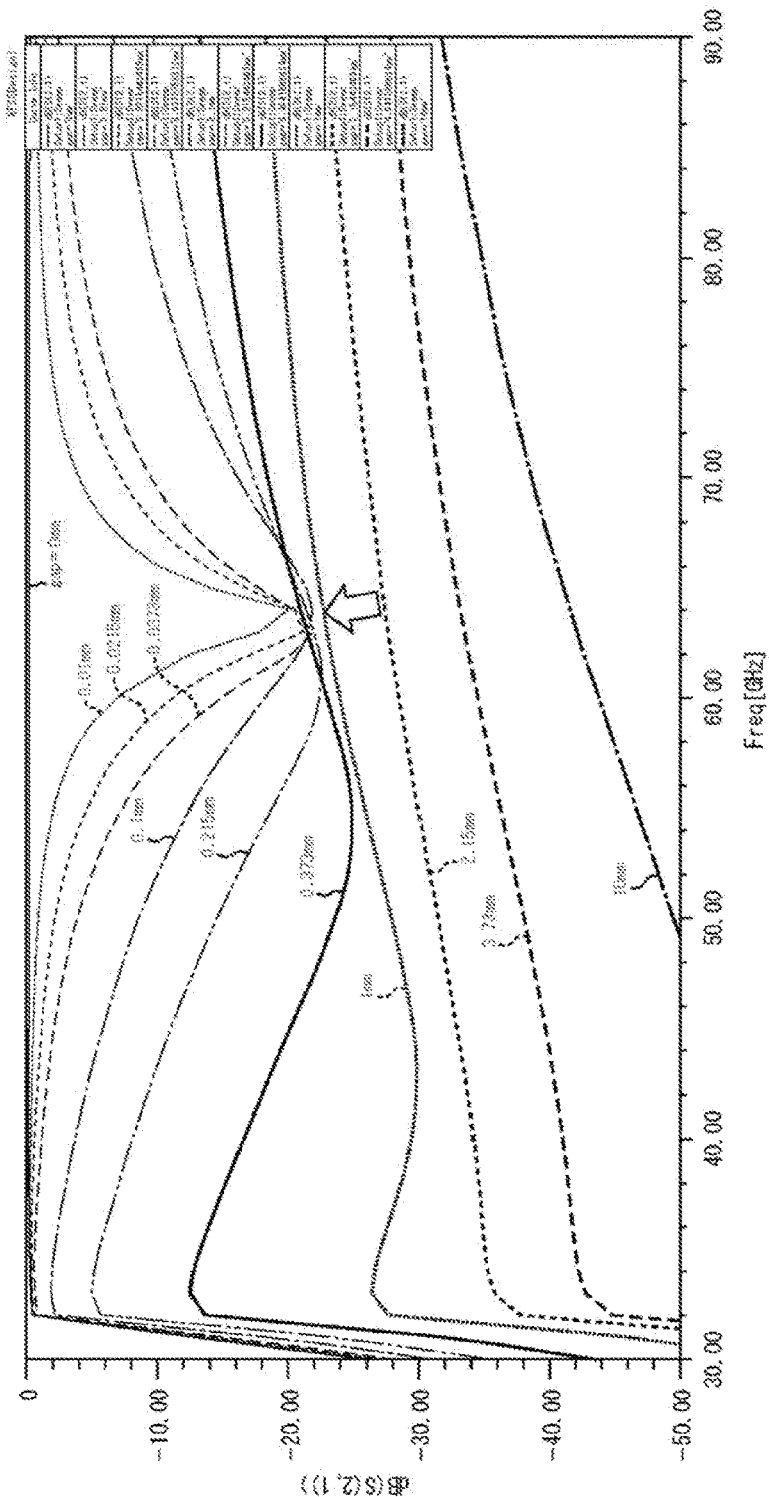
FIG. 12 is a diagram illustrating simulation results of the second simulation.

FIG. 12 is a diagram illustrating simulation results of the second simulation described in FIG. 11.

That is, FIG. 12 illustrates a relationship between a carrier frequency and the transfer coefficient S21 from the waveguide 112 to the waveguide 212 for each of the plurality of gaps between the waveguides 112 and 212 acquired in the second simulation.

According to the simulation results in FIG. 12, it can be confirmed that when the distance of the gap between the end faces of the waveguides 112 and 212 changes from a 0 state to a non-0 state in the carrier frequency range of 55 to 70 GHz, that is, when the waveguides 112 and 212 are separated slightly from a contact state, the transfer coefficient S21 declines sharply.

In the detection mode, contact between the waveguide 112 of the communication apparatus 100 and the waveguide 212 of the communication apparatus 200 is detected by taking advantage of the fact that the transfer coefficient S21 changes sharply between a state in which the waveguides 112 and 212 are in contact and a state in which the waveguides 112 and 212 are slightly separated.

FIGS. 13A and 13B depict diagrams describing the detection mode and the communication mode.

FIG. 13A is a diagram describing the detection mode.

In the detection mode, the transmitter 121 of the communication apparatus 100, an initiator, sends a narrow-band low-level signal to the waveguide 112 as described in FIGS. 8A and 8B.

As a narrow-band low-level signal, a low-level carrier (carrier whose level is low) or a low-rate modulated signal (modulated signal whose level is low acquired by modulating a carrier with a low-rate (narrow-band) baseband signal) can be used as described in FIGS. 8A and 8B.

In the detection mode, the narrow-band low-level signal sent by the transmitter 121 to the waveguide 112 propagates through the waveguide 112 and reaches the outer end face of the waveguide 112.

In the case where the communication apparatuses 100 and 200 are separated, the outer end face of the waveguide 112 is in contact with a space. As a result, nearly all the narrow-band low-level signal is reflected by the outer end face of the waveguide 112 because of the difference in dielectric constant. Therefore, there is little radio wave leakage of the narrow-band low-level signal as a radio wave from the outer end face of the waveguide 112.

Also, even if there is a radio wave leakage, the extent (intensity) of the radio wave leakage is slight. Further, because the narrow-band low-level signal is narrow in band and low in level, it does not cause radio wave emission of a high-level or wide-band signal that would violate laws as a radio wave leakage.

Therefore, in the case where the communication apparatuses 100 and 200 are separated, there is little radio wave leakage of a narrow-band low-level signal from the outer end face of the waveguide 112.

In the case where the communication apparatus 100, an initiator, and the communication apparatus 200, a target, are separated, the narrow-band low-level signal does not reach the communication apparatus 200 from the communication apparatus 100, or even if it does, the narrow-band low-level signal that propagates through the waveguide 212 and is received by the receiver 222 turns out to be extremely small in level.

That is, in the case where the communication apparatuses 100 and 200 are separated, the level of the narrow-band low-level signal received by the receiver 222 is smaller than a predetermined detection mode threshold.

In the case where the level of the narrow-band low-level signal received by the communication apparatus 200 (the receiver 222 thereof), a target, is smaller than the predetermined detection mode threshold, the communication apparatuses 100 and 200 (the transmitter 121 and the receiver 222 of the respective communication apparatuses) are kept in the detection mode as an operation mode.

It should be noted that it is possible to improve the reception sensitivity of the receiver 222 of the communication apparatus 200, a target, by narrowing the reception band and thereby reducing thermal noise. The reception sensitivity of the receiver 222 can be narrowed, for example, by narrowing the band of the target signal to be amplified by the amplifier 241 illustrated in FIG. 6 or the pass band of the LPF 243.

When the waveguide 112 of the communication apparatus 100 and the waveguide 212 of the communication apparatus 200 come into contact in the detection mode, the narrow-band low-level signal sent by the transmitter 121 propagates through the waveguides 112 and 212, and reaches and is received by the receiver 222 while maintaining its level to some extent.

That is, in the case where the waveguides 112 and 212 are in contact with each other, the level of the narrow-band low-level signal received by the receiver 222 via the waveguide 212 increases significantly from the level of the narrow-band low-level signal received by the receiver 222 via the waveguide 212 in the case where the waveguides 112 and 212 are not in contact with each other and becomes equal to or exceeds the detection mode threshold.

When the level of the narrow-band low-level signal received by the receiver 222 becomes equal to or exceeds the detection mode threshold, the communication apparatuses 100 and 200 (the transmitter 121 and the receiver 222 of the respective communication apparatuses) switch their operation mode from the detection mode to the communication mode.

FIG. 13B is a diagram describing the communication mode.

In the communication mode, in the transmitter 121, for example, a predetermined high-rate baseband signal is converted, in frequency, to a millimeter wave band modulated signal with a carrier. Further, in the transmitter 121, the modulated signal is amplified with a given high gain by the amplifier 133 (FIG. 6), and a modulated signal having a larger level and a larger frequency band than the narrow-band low-level signal is sent.

The modulated signal sent by the transmitter 121 propagates through the waveguides 112 and 212 that are in contact with each other and reaches and is received by the receiver 222 while maintaining its level to some extent.

The modulated signal that is sent by the transmitter 121 and propagates through the waveguides 112 and 212 in the communication mode is a signal having a larger level and a larger frequency band than the narrow-band low-level signal. However, the waveguides 112 and 212 are in contact with each other. Therefore, no radio wave leakage of the modulated signal as a radio wave does not occur.

Therefore, it is possible to prevent radio wave leakage causing leakage of a high-level modulated signal or a wide-band modulated signal, allowing for compliance with laws regulating radio wave.

It should be noted that in the case where the receiver 222 of the communication apparatus 200, a target, narrows the reception band for improving the reception sensitivity of a narrow-band low-level signal in the detection mode, a modulated signal large in frequency band, i.e., a high-rate baseband signal, is received by widening the reception band (changing the reception band back to its initial state) when the operation mode is switched from the detection mode to the communication mode.

<Operation of the Communication Apparatuses 100 and 200>

FIG. 14 is a flowchart describing an example of operation of the communication apparatus 100, an initiator, and the communication apparatus 200, a target.

In the communication apparatus 100, an initiator, the control section 113 (FIG. 3) sets, in step S11, the operation mode to the detection mode, and the process proceeds to step S12.

In step S12, the transmitter 121 of the communication apparatus 100 sends a narrow-band low-level signal in response to the fact that the operation mode is the detection mode, and the process proceeds to step S13.

In step S13, the control section 113 of the communication apparatus 100 determines whether a signal equal to or larger in level than a threshold has been received by the receiver 122 (FIG. 6).

That is, as will be described later, in the case where a narrow-band low-level signal equal to or larger in level than a detection mode threshold has been received by the receiver 222, the communication apparatus 200, a target, sends a reception confirmation signal representing the reception of a narrow-band low-level signal (e.g., a carrier itself or the narrow-band (low-rate) modulated signal resulting from modulation of a carrier with a baseband signal representing the reception of a narrow-band low-level signal) from the transmitter 221.

In the case where the communication apparatuses 100 and 200 are separated (the waveguides 112 and 212 are not in contact with each other), the reception confirmation signal sent from the communication apparatus 200 propagates through the waveguide 212, and (nearly all the reception confirmation signal) is reflected by the end face exposed on the housing surface of the communication apparatus 100.

Therefore, the reception confirmation signal sent from the communication apparatus 200 does not reach the receiver 122 of the communication apparatus 100, or even if it does, the reception confirmation signal received by the receiver 122 of the communication apparatus 100 turns out to be extremely small in level.

On the other hand, in the case where the communication apparatuses 100 and 200 are in contact with each other (the waveguides 112 and 212 are in contact with each other), the reception confirmation signal sent from the communication apparatus 200 propagates through the waveguides 212 and 112 and is received at some level by the receiver 122 of the communication apparatus 100.

Therefore, in the case where the communication apparatuses 100 and 200 are in contact with each other, a reception confirmation signal equal to or greater in level than the threshold is received by the receiver 122.

In step S13, the control section 113 of the communication apparatus 100 determines whether a reception confirmation signal from the communication apparatus 200 has been received by the receiver 122 at a level equal to or larger than the threshold, that is, whether a reception confirmation signal equal to or larger in level than the threshold has been received.

In the case where it is determined in step S13 that a reception confirmation signal equal to or larger in level than the threshold has not been received, that is, in the case where a reception confirmation signal equal to or larger in level than the threshold cannot be received from the communication apparatus 200 because the waveguide 112 of the communication apparatus 100 and the waveguide 212 of the communication apparatus 200 are not in contact with each other, the process returns to step S12, and similar processes are repeated from here onward.

On the other hand, in the case where it is determined in step S13 that a reception confirmation signal equal to or larger in level than the threshold has been received, that is, in the case where the waveguide 112 of the communication apparatus 100 and the waveguide 212 of the communication apparatus 200 are in contact with each other and a reception confirmation signal equal to or larger in level than the threshold has been received by the communication apparatus 100 from the communication apparatus 200, the process proceeds to step S14.

In step S14, the control section 113 of the communication apparatus 100 causes the transmitter 121 to send a mode switching signal that requests the switching of the operation mode from the detection mode to the communication mode (e.g., a carrier itself or a narrow-band modulated signal resulting from modulation of a carrier with a baseband signal requesting the switching to the communication mode), and the process proceeds to step S15.

The mode switching signal sent by the receiver 121 of the communication apparatus 100 propagates through the waveguides 112 and 212 that are in contact with each other and is received by the receiver 222 of the communication apparatus 200.

When the mode switching signal is received by the receiver 222, the communication apparatus 200 sends a switching confirmation signal representing the reception of a mode switching signal from the transmitter 221 as will be described later.

The switching confirmation signal sent by the transmitter 221 propagates through the waveguides 212 and 112 that are in contact with each other and is received by the receiver 122 of the communication apparatus 100.

In step S15, the communication apparatus 100 goes into standby and waits for a switching confirmation signal sent by the transmitter 221 of the communication apparatus 200, and the process proceeds to step S16.

In step S16, the control section 113 of the communication apparatus 100 determines whether a switching confirmation signal from the communication apparatus 200 has been received by the receiver 122 at a level equal to or larger than the threshold, that is, whether a switching confirmation signal equal to or larger in level than the threshold has been received.

In the case where it is determined in step S16 that a switching confirmation signal at a level equal to or larger than the threshold has not been received by the receiver 122, the process returns to step S12, and similar processes are repeated from here onward.

That is, for example, after the waveguides 112 and 212 had come into contact with each other, the contact between them was broken. Therefore, in the case where a switching confirmation signal equal to or larger in level than the threshold cannot be received by the receiver 122, the process returns from step S16 to step S12, and the transmission of a narrow-band low-level signal is repeated.

On the other hand, in the case where it is determined in step S16 that a switching confirmation signal equal to or larger in level than the threshold has been received by the receiver 122, the process proceeds to step S17.

That is, in the case where, due to the reception of a narrow-band low-level signal equal to or larger in level than the detection mode threshold by the receiver 222 of the communication apparatus 200, a reception confirmation signal and a switching confirmation signal equal to or larger in level than the threshold have been received by the communication apparatus 100 from the communication apparatus 200, the process proceeds from step S16 to step S17.

In step S17, the control section 113 of the communication apparatus 100 sets (switches) the operation mode of the communication apparatus 100 from the detection mode to the communication mode in response to the reception of a reception confirmation signal and a switching confirmation signal equal to or larger in level than the threshold from the communication apparatus 200, that is, in response to the reception of narrow-band low-level signals equal to or larger in level than the detection mode threshold by the receiver 222 of the communication apparatus 200, and the process proceeds to step S18.

In step S18, the control section 113 of the communication apparatus 100 initiates the transmission and reception, via the waveguides 112 and 212 that are in contact with each other, of a signal (also referred to as a wide-band high-level signal) acquired by amplifying a modulated signal, resulting from modulation of a carrier with a high-rate baseband signal, with a high gain by controlling the transmitter 121 and the receiver 122, and the process proceeds to step S19.

In step S19, the control section 113 of the communication apparatus 100 determines whether the receiver 122 (FIG. 6) can no longer receive a signal equal to or larger in level than the threshold.

That is, when the waveguides 112 and 212 come into contact with each other, the communication apparatuses 100 and 200 go from the detection mode to the communication mode as described above and initiate the transmission and reception of a wide-band high-level signal.

In the case where the waveguides 112 and 212 are in contact with each other, the wide-band high-level signal sent and received by the communication apparatuses 100 and 200 is so to speak "confined" inside the waveguides 112 and 212 that are in contact with each other. Therefore, radio wave leakage of the wide-band high-level signal as a radio wave does not occur. Further, the receiver 122 of the communication apparatus 100 can receive the wide-band high-level signal sent by the transmitter 221 of the communication apparatus 200 at a level equal to or larger than a predetermined threshold for a wide-band high-level signal (hereinafter also referred to as a communication mode threshold). Similarly, the receiver 222 of the communication apparatus 200 can receive the wide-band high-level signal sent by the transmitter 121 of the communication apparatus 100 at a level equal to or larger than a communication mode threshold.

On the other hand, in the case where the contact between the waveguides 112 and 212 is broken, the level of the wide-band high-level signal from the communication apparatus 200 that propagates through the waveguide 112 and is received by the receiver 122 of the communication apparatus 100 declines. Similarly, the level of the wide-band high-level signal that propagates through the waveguide 212 and is received by the receiver 222 of the communication apparatus 200 also declines.

Therefore, when the contact between the waveguides 112 and 212 is broken, both the receiver 112 of the communication apparatus 100 and the receiver 212 of the communication apparatus 200 can no longer receive the wide-band high-level signal at a level equal to or larger than the communication mode threshold.

In step S19, the control section 113 of the communication apparatus 100 determines whether the contact between the waveguides 112 and 212 has been broken and the receiver 112 of the communication apparatus 100 can no longer receive a wide-band high-level signal equal to or larger in level than the communication mode threshold as described above.

In the case where it is determined in step S19 that the receiver 112 of the communication apparatus 100 can receive a wide-band high-level signal equal to or larger in level than the communication mode threshold, the process returns to step S19, and similar processes are repeated from here onward.

That is, in the case where the contact between the waveguides 112 and 212 is maintained and the receiver 112 of the communication apparatus 100 can receive a wide-band high-level signal equal to or larger in level than the communication mode threshold from the communication apparatus 200, the communication mode is maintained, and the transmission and reception of a wide-band high-level signal continues.

On the other hand, in the case where it is determined in step S19 that the receiver 112 of the communication apparatus 100 can no longer receive a wide-band high-level signal equal to or larger in level than the communication mode threshold, the process returns to step S11.

In step S11, as described above, the control section 113 of the communication apparatus 100 sets the operation mode to the detection mode, and similar processes are repeated from here onward.

That is, in the case where the contact between the waveguides 112 and 212 is broken and the receiver 112 of the communication apparatus 100 can no longer receive a wide-band high-level signal equal to or larger in level than the communication mode threshold, the communication apparatus 100 switches the operation mode from the communication mode to the detection mode.

On the other hand, in the communication apparatus 200, a target, the control section 213 (FIG. 3) sets the operation mode to the detection mode in step S31, and the process proceeds to step S32.

In step S32, the receiver 222 of the communication apparatus 200 initiates the reception of a narrow-band low-level signal, and the process proceeds to step S33.

That is, in the detection mode, the communication apparatus 100, an initiator, sends a narrow-band low-level signal in step S12 as described above. Therefore, the receiver 222 of the communication apparatus 200, a target, initiates the reception of a narrow-band low-level signal from the communication apparatus 100 in step S32.

In step S33, the control section 213 of the communication apparatus 200 determines whether a narrow-band low-level signal equal to or larger in level than the detection mode threshold has been received by the receiver 222 (FIG. 6).

In the case where it is determined in step S33 that a narrow-band low-level signal equal to or larger in level than the detection mode threshold has not been received by the receiver 222, the process returns to step S33, and similar processes are repeated from here onward.

That is, in the case where the level of the narrow-band low-level signal from the communication apparatus 100 received by the receiver 222 of the communication apparatus 200 is smaller than the predetermined detection mode threshold because the waveguides 112 and 212 are not in contact with each other, the reception of the narrow-band low-level signal by the receiver 222 continues.

On the other hand, in the case where it is determined in step S33 that a narrow-band low-level signal equal to or larger in level than the detection mode threshold has been received by the receiver 222, the process proceeds to step S34.

That is, in the case where the level of the narrow-band low-level signal from the communication apparatus 100 received by the receiver 222 of the communication apparatus 200 is equal to or larger than the detection mode threshold because the waveguides 112 and 212 are in contact with each other, the process proceeds to step S34.

In step S34, the control section 213 of the communication apparatus 200 controls the transmitter 221 to send a reception confirmation signal in response to the reception of a narrow-band low-level signal equal to or larger in level than the detection mode threshold, and the process proceeds to step S35.

In step S35, the communication apparatus 200 waits for a mode switching signal sent from the communication apparatus 100 in step S14, and the process proceeds to step S36.

In step S36, the control section 213 of the communication apparatus 200 determines whether a mode switching signal from the communication apparatus 100 has been received by the receiver 222.

That is, the reception confirmation signal sent by the transmitter 221 in step S34 propagates through the waveguides 212 and 112 that are in contact with each other and is received by the receiver 122 of the communication apparatus 100 at a level equal to or larger than the threshold.

The communication apparatus 100 that has received, with the receiver 122, the reception confirmation signal at a level equal to or larger than the threshold sends a mode switching signal in step S14 as described above. For this reason, the communication apparatus 200 waits for a mode switching signal from the communication apparatus 100 in step S35 and determines, in step S36, whether a mode switching signal has been received from the communication apparatus 100.

In the case where it is determined in step S36 that a mode switching signal has not been received from the communication apparatus 100, the process returns to step S32, and similar processes are repeated from here onward.

That is, for example, in the case where the receiver 222 of the communication apparatus 200 could not receive a mode switching signal because the contact between the waveguides 112 and 212 was broken after the waveguides 112 and 212 had come into contact with each other, the process returns from step S36 to step S32, and the reception of a narrow-band low-level signal is initiated.

On the other hand, in the case where it is determined in step S36 that a mode switching signal has been received by the receiver 122, the process proceeds to step S37.

In step S37, the control section 213 of the communication apparatus 200 controls the transmitter 221 to send a switching confirmation signal in response to the reception of a mode switching signal, and the process proceeds to step S38.

The switching confirmation signal propagates through the waveguides 212 and 112 that are in contact with each other and is received by the receiver 122 of the communication apparatus 100.

In step S38, the control section 213 of the communication apparatus 200 sets the operation mode of the communication apparatus 200 from the detection mode to the communication mode in response to the reception of a mode switching signal from the communication apparatus 100, that is, in response to the reception of a narrow-band low-level signal equal to or larger in level than the detection mode threshold by the receiver 222, and the process proceeds to step S39.

In step S39, the control section 213 of the communication apparatus 200 controls the transmitter 221 and the receiver 222 to initiate the transmission and reception of a wide-band high-level signal (signal acquired by amplifying a modulated signal, resulting from modulation of a carrier with a high-rate baseband signal, with a high gain) via the waveguides 212 and 112 that are in contact with each other, and the process proceeds to step S40.

In step S40, the control section 213 of the communication apparatus 2100 determines whether the receiver 222 can no longer receive a signal equal to or larger in level than the threshold.

That is, when the waveguides 112 and 212 come into contact with each other, the communication apparatuses 100 and 200 go from the detection mode to the communication mode and initiate the transmission and reception of a wide-band high-level signal as described above in steps S17 and S39.

In the case where the waveguides 112 and 212 are in contact with each other, a wide-band high-level signal sent by the transmitter 121 of the communication apparatus 100 can be received by the receiver 222 of the communication apparatus 200 at a level equal to or larger than the communication mode threshold without producing radio wave leakage of the wide-band high-level signal as a radio wave.

On the other hand, when the contact between the waveguides 112 and 212 is broken, the level of the wide-band high-level signal received by the receiver 222 of the communication apparatus 200 declines.

Therefore, when the contact between the waveguides 112 and 212 is broken, a wide-band high-level signal at a level equal to or larger than the communication mode threshold can no longer be received by the receiver 212 of the communication apparatus 200.

In step S40, the control section 213 of the communication apparatus 200 determines whether a wide-band high-level signal at a level equal to or larger than the communication mode threshold can no longer be received by the receiver 212 of the communication apparatus 200 because the contact between the waveguides 112 and 212 has been broken as described above.

In the case where it is determined in step S40 that a wide-band high-level signal at a level equal to or larger than the communication mode threshold can be received by the receiver 212 of the communication apparatus 200, the process returns to step S40, and similar processes are repeated from here onward.

That is, in the case where the waveguides 112 and 212 are in contact with each other and a wide-band high-level signal at a level equal to or larger than the communication mode threshold can be received by the receiver 212 of the communication apparatus 200 from the communication apparatus 100, the communication mode is maintained, and the transmission and reception of a wide-band high-level signal continues.

On the other hand, in the case where it is determined in step S40 that a wide-band high-level signal at a level equal to or larger than the communication mode threshold can no longer be received by the receiver 212 of the communication apparatus 200, the process returns to step S31.

In step S31, the control section 213 of the communication apparatus 200 sets the operation mode to the detection mode as described above, and similar processes are repeated from here onward.

That is, in the case where the contact between the waveguides 112 and 212 is broken and the receiver 212 of the communication apparatus 200 can no longer receive a wide-band high-level signal equal to or larger in level than the communication mode threshold, the communication apparatus 200 switches the operation mode from the communication mode to the detection mode.

Thus, the transmitter 121 sends a given signal such as narrow-band low-level signal to the waveguide 112 in the detection mode and goes from the detection mode to the communication mode in response to a narrow-band low-level signal equal to or larger in level than the detection mode threshold received by the receiver 222 via the waveguide 212. Then, the transmitter 121 sends a modulated signal via the waveguides 112 and 212 in the communication mode.

On the other hand, the receiver 222 receives a narrow-band low-level signal via the waveguide 212 in the detection mode and goes from the detection mode to the communication mode in response to a narrow-band low-level signal equal to or larger in level than the detection mode threshold received via the waveguide 212. Then, the receiver 222 receives a modulated signal in the communication mode via the waveguides 112 and 212.

That is, in the case where a narrow-band low-level signal equal to or larger in level than the detection mode threshold is received by the receiver 222, the transmitter 121 and the receiver 222 switch the operation mode from the detection mode to the communication mode, assuming that the waveguides 112 and 212 have come into contact (the contact therebetween has been detected), allowing for transmission and reception of a modulated signal.

Therefore, it is possible for the transmitter 121 and the receiver 222 to detect the contact between the waveguide 112 on the side of the transmitter 121 and the waveguide 212 on the side of the receiver 222 in the detection mode without using the contact detection apparatuses 13 and 23 dedicated for contact detection and further possible to send and receive a modulated signal with the waveguides 112 and 212 maintained in contact with each other.

As a result, it is possible to keep upsizing and cost increase of the communication apparatuses 100 and 200 to a minimum thanks to the provision of the contact detection apparatuses 13 and 23.

Also, in the case where there is a concern over significant radio wave leakage because the waveguides 112 and 212 are not in contact with each other, the transmitter 121 and the receiver go into the detection mode and send and receive a narrow-band low-level signal, thereby making it possible to comply with laws regulating radio waves.

Further, in the case where the waveguides 112 and 212 are in contact with each other, the transmitter 121 and the receiver 222 go into the communication mode and send and receive a wide-band high-level signal. However, because the waveguides 112 and 212 are in contact with each other, it is possible to prevent radio wave leakage of a wide-band high-level signal and comply with laws regulating radio wave.

It should be noted that a low-level carrier or a low-rate modulated signal, for example, can be used as a narrow-band low-level signal as described in FIGS. 8A and 8B. In the case where a low-rate modulated signal is used as a narrow-band low-level signal, a given pattern requesting the switching of the operation mode, for example, can be adopted as a baseband signal that is used for generating the low-rate modulated signal.

In this case, it is possible to assume that the waveguides 112 and 212 have come into contact when the communication apparatus 200 successfully demodulates the given pattern requesting the switching of the operation mode from the low-rate modulated signal as a narrow-band low-level signal received by the receiver 22.

Alternatively, in this case, it is possible to consider that the waveguides 112 and 212 have come into contact when the level of the low-rate modulated signal received by the receiver 22 is equal to or larger than the detection mode threshold and when the given pattern requesting the switching of the operation mode is successfully demodulated from the low-rate modulated signal.

Further, in FIG. 14, in the case where a narrow-band low-level signal equal to or larger in level than the detection mode threshold and a mode switching signal are received by the receiver 222 of the communication apparatus 200 and a reception confirmation signal and a switching confirmation signal are received by the receiver 122 of the communication apparatus 100, the operation mode is switched from the detection mode to the communication mode. However, the operation mode can be switched by an arbitrary method using a narrow-band low-level signal received by the receiver 222 of the communication apparatus 200.

That is, for example, the communication apparatuses 200 and 100 can switch the operation mode from the detection mode to the communication mode, respectively, in the case where a narrow-band low-level signal equal to or larger in level than the detection mode threshold is received by the receiver 222 and in the case where a reception confirmation signal is received by the receiver 122 in response to the reception of a narrow-band low-level signal equal to or larger in level than the detection mode threshold by the receiver 222.

Also, for example, in the case where a narrow-band low-level signal received by the receiver 222 of the communication apparatus 200 increases sharply (increases to or above a predetermined threshold) or declines sharply (declines to or below a predetermined threshold), it is possible to switch the operation mode from the detection mode to the communication mode or from the communication mode to the detection mode by assuming that the waveguides 112 and 212 have come into contact or that the contact between the waveguides 112 and 212 has been broken (detected).

Thus, in the case where the operation mode is switched in response to the level of the narrow-band low-level signal received by the receiver 222 of the communication apparatus 200 (reception level), the operation mode can be switched in response to the absolute level of the narrow-band low-level signal compared with the detection mode threshold or in response to the amount of change of the level of the narrow-band low-level signal.

Here, in FIG. 14, in the case where the (absolute) level of the narrow-band low-level signal received by the receiver 222 is equal to or larger than the detection mode threshold, the operation mode is switched from the detection mode to the communication mode, and in the case where the (absolute) level of the wide-band high-level signal, a modulated signal received by the receiver 122 or 222, is equal to or smaller than the communication mode threshold (is not equal to or larger than the communication mode threshold), the operation mode is switched from the communication mode to the detection mode. However, the same value or different values may be used as a detection mode threshold and a communication mode threshold for switching the operation mode.

<Switching Between the Operation Modes in the Case where Different Values are Used as the Detection Mode Threshold and the Communication Mode Threshold>

FIGS. 15A and 15B depict diagrams describing switching between the operation modes in the case where different values are used as the detection mode threshold and the communication mode threshold.

FIG. 15A is a diagram describing switching between the operation modes in the case where a value smaller than a detection mode threshold (first threshold) THon is used as a communication mode threshold (second threshold) THoff.

In FIG. 15A, when a level Prx of the narrow-band low-level signal received by the receiver 222 increases to or above the detection mode threshold THon that is larger than the communication mode threshold THoff, the operation mode changes to the communication mode.

Then, when the level Prx of the modulated signal received by the receiver 122 or 222 drops to or below the communication mode threshold THoff that is smaller than the detection mode threshold THon, the operation mode changes to the detection mode.

Thus, in the case where a value smaller than the detection mode threshold THon is used as the communication mode threshold THoff, it is possible to prevent accidental switching of the operation mode from the detection mode to the communication mode due to the reception of a small-level signal such as noise by the receiver 222.

Further, in the case where the level Prx of the modulated signal received by the receiver 122 or 222 drops momentarily for some kind of cause, it is possible to prevent accidental switching of the operation mode from the communication mode to the detection mode.

FIG. 15B is a diagram describing switching between the operation modes in the case where a value larger than the detection mode threshold (first threshold) THon is used as the communication mode threshold THoff.

In FIG. 15B, when the level Prx of the narrow-band low-level signal received by the receiver 222 increases to or above the detection mode threshold THon that is smaller than the communication mode threshold THoff, the operation mode changes to the communication mode.

Then, when the level Prx of the modulated signal received by the receiver 122 or 222 drops to or below the communication mode threshold THoff that is larger than the detection mode threshold THon, the operation mode changes to the detection mode.

Thus, in the case where a value larger than the detection mode threshold THon is used as the communication mode threshold THoff, it is possible to reduce power consumption by keeping to a minimum the level of the narrow-band low-level signal sent by the transmitter 121 and at the same time render the response to switching from the detection mode to the communication mode sensitive.

Further, in the case where the waveguides 112 and 212 slip out of contact and the modulated signal is radiated into a space after the operation mode has changed to the communication mode as a result of contact between the waveguides 112 and 212, the operation mode is immediately switched from the communication mode to the detection mode, minimizing radio wave leakage of the modulated signal more positively.

<Other Example of Switching Between the Operation Modes>

FIG. 16 is a diagram describing another example of switching between the operation modes.

Although, in FIGS. 3, 4, 5, 6, 7, 8A, 8B, 9, 10, 11, 12, 13A, 13B, 14, 15A, and 15B, the operation mode is switched from the detection mode to the communication mode in response to the narrow-band low-level signal received by the receiver 222 of the communication apparatus 200, a target, the operation mode can be switched from the detection mode to the communication mode in response to the narrow-band low-level signal received by the receiver 222 of the communication apparatus 200, a target, and the narrow-band low-level signal received by the receiver 122 of the communication apparatus 100, an initiator.

FIG. 16 is a diagram describing switching between the operation modes that takes place in response to the narrow-band low-level signal received by the receiver 222 and the narrow-band low-level signal received by the receiver 122.

It should be noted that in the case where the operation mode is switched in response to the narrow-band low-level signal received by the receiver 222 and the narrow-band low-level signal received by the receiver 122, we assume as described in FIG. 4 that the waveguide 112 includes one waveguide that is used for both transmission and reception.

As described in FIGS. 8A and 8B, the narrow-band low-level signal sent by the transmitter 121 from the antenna 123 to the waveguide 112 in the detection mode propagates through the waveguide 112 and reaches the outer end face of the waveguide 112.

Then, in the case where the waveguides 112 and 212 are separated (in the case where the communication apparatuses 100 and 200 are separated), the outer end face of the waveguide 112 is in contact with a space. As a result, nearly all the narrow-band low-level signal is reflected by the outer end face of the waveguide 112 because of the difference in dielectric constant.

The narrow-band low-level signal reflected by the outer end face of the waveguide 112 propagates back through the waveguide 112 to the side of the antenna 123 and is received by the antenna 123, and eventually by the receiver 122.

In the case where the waveguides 112 and 212 are separated, nearly all the narrow-band low-level signal sent by the transmitter 121 is reflected by the outer end face of the waveguide 112 as described above. Therefore, the receiver 122 receives the narrow-band low-level signal that is large in level to some extent.

On the other hand, in the case where the waveguides 112 and 212 are in contact with each other, the narrow-band low-level signal sent by the transmitter 121 propagates through the waveguides 112 and 212 and reaches and is received by the receiver 222 while maintaining its level to some extent.

Then, in the case where the waveguides 112 and 212 are in contact with each other, the narrow-band low-level signal is hardly reflected by the outer end face of the waveguide 112.

Therefore, in the case where the waveguides 112 and 212 are in contact with each other, a narrow-band low-level signal with a large level is received by the receiver 222. However, a narrow-band low-level signal with an extremely low level is received by the receiver 122 (or a narrow-band low-level signal is not received at all).

From the above, in the case where the waveguides 112 and 212 are separated, a narrow-band low-level signal having a small level is received by the receiver 222 (or a narrow-band low-level signal is not received at all). However, a narrow-band low-level signal having a large level is received by the receiver 122.

On the other hand, in the case where the waveguides 112 and 212 are in contact with each other, a narrow-band low-level signal having a large level is received by the receiver 222. However, a narrow-band low-level signal having a small level is received by the receiver 122 (or a narrow-band low-level signal is not received at all).

Therefore, in the case where a narrow-band low-level signal having a small level is received by the receiver 222 and a narrow-band low-level signal having a large level is received by the receiver 122, it is possible to switch the operation mode to the detection mode by assuming that the contact between the waveguides 112 and 212 has been broken.

Also, in the case where a narrow-band low-level signal having a large level is received by the receiver 222 and a narrow-band low-level signal having a small level is received by the receiver 122, it is possible to switch the operation mode to the communication mode by assuming that the waveguides 112 and 212 are in contact with each other.

Here, whether the level is large or small can be determined by comparison with a threshold determined in advance.

It should be noted that, in switching the operation mode to the detection mode, it is possible to take advantage of a sharp increase of a narrow-band low-level signal received by the receiver 122 (increase to or above a predetermined threshold) rather than the reception of a narrow-band low-level signal having a large level by the receiver 122.

Similarly, in switching the operation mode to the communication mode, it is possible to take advantage of a sharp decline in a narrow-band low-level signal received by the receiver 122 (decline to or below a predetermined threshold) rather than the reception of a narrow-band low-level signal having a small level by the receiver 122.

Thus, in the case where the operation mode is switched by detecting the contact between the waveguides 112 and 212 and the breaking of the contact therebetween in response to the narrow-band low-level signal received by the receiver 222 of the communication apparatus 200, a target, and the narrow-band low-level signal received by the receiver 122 of the communication apparatus 100, an initiator (narrow-band low-level signal that returns after being reflected by the outer end face of the waveguide 112), it is possible to improve the accuracy for detecting the contact between the waveguides 112 and 212 and the breaking of the contact therebetween.

It should be noted that embodiments of the present technology are not limited to that described above and can be modified in various ways without departing from the gist of the present technology.

For example, although, in the present embodiment, a millimeter wave band signal was used as a modulated signal (and as a carrier), a signal having a lower frequency or a higher frequency (e.g., light) than a millimeter wave band signal may be used as a modulated signal.

Also, the effects described in the present specification are merely illustrative, and there may be other effects.

Further, in the present specification, a system refers to a set of a plurality of components (e.g., apparatuses, modules (parts)), and it does not matter whether or not all the components are accommodated in the same housing. Therefore, a plurality of apparatuses accommodated in different housings and connected via a network and a plurality of modules accommodated in a single housing are both systems.

It should be noted that the present technology can have the following configurations:

<1>
A transmitter having as operation modes:
a detection mode adapted to detect contact between a first waveguide on a side of the transmitter and a second waveguide on a side of a receiver; and
a communication mode adapted to send a modulated signal acquired through frequency conversion of a baseband signal via the first and second waveguides, in which
the transmitter
sends a given signal to the first waveguide in the detection mode,
goes from the detection mode to the communication mode in response to the given signal received by the receiver via the second waveguide, and
sends the modulated signal via the first and second waveguides in the communication mode.

<2>
The transmitter of feature <1>, in which
the given signal is a narrow-band low-level signal that is narrower in band and lower in level than the modulated signal.

<3>
The transmitter of feature <1> or <2>, in which
the transmitter goes to the communication mode in the case where the level of the given signal received by the receiver via the second waveguide is equal to or larger than a threshold.

<4>
The transmitter of feature <3>, in which
in the detection mode, the transmitter goes to the communication mode in the case where the level of the given signal received by the receiver via the second waveguide is equal to or larger than a first threshold, and in the communication mode, the transmitter goes to the detection mode in the case where the level of the modulated signal received via the first waveguide is larger than the first threshold or equal to or smaller than a second threshold.

<5>
The transmitter of any one of features <1> to <4>, in which
the transmitter goes from the detection mode to the communication mode also in response to the given signal that returns after being reflected by the end face of the first waveguide.

<6>
The transmitter of any one of features <1> to <5>, in which
the first and second waveguides include a piece of hollow metal filled inside with a given dielectric.

<7>
The transmitter of any one of features <1> to <6>, in which
the given signal and the modulated signal are millimeter wave band signals.

<8>
A transmission method of a transmitter having as operation modes:
a detection mode adapted to detect contact between a first waveguide on a side of the transmitter and a second waveguide on a side of a receiver; and
a communication mode adapted to send a modulated signal acquired through frequency conversion of a baseband signal via the first and second waveguides, in which
the transmitter
sends a given signal to the first waveguide in the detection mode,
goes from the detection mode to the communication mode in response to the given signal received by the receiver via the second waveguide, and
sends the modulated signal via the first and second waveguides in the communication mode.

<9>
A receiver having as operation modes:
a detection mode adapted to detect contact between a first waveguide on a side of a transmitter and a second waveguide on a side of the receiver; and
a communication mode adapted to send a modulated signal acquired through frequency conversion of a baseband signal via the first and second waveguides, in which
the receiver
receives a given signal via the second waveguide in the detection mode,
goes from the detection mode to the communication mode in response to the given signal received via the second waveguide, and
receives the modulated signal via the first and second waveguides in the communication mode.

<10>
The receiver of feature <9>, in which
the given signal is a narrow-band low-level signal that is narrower in band and lower in level than the modulated signal.

<11>
The receiver of feature <9> or <10>, in which
the receiver goes to the communication mode in the case where the level of the given signal received via the second waveguide is equal to or larger than a threshold.

<12>
The receiver of feature <11>, in which
in the detection mode, the receiver goes to the communication mode in the case where the level of the given signal received via the second waveguide is equal to or larger than a first threshold, and in the communication mode, the receiver goes to the detection mode in the case where the level of the modulated signal received via the second waveguide is larger than the first threshold or equal to or smaller than a second threshold.

<13>
The receiver of any one of features <9> to <12>, in which
the first and second waveguides include a piece of hollow metal filled inside with a given dielectric.

<14>
The receiver of any one of features <9> to <13>, in which
the given signal and the modulated signal are millimeter wave band signals.

<15>
A reception method of a receiver having as operation modes:
a detection mode adapted to detect contact between a first waveguide on a side of a transmitter and a second waveguide on a side of the receiver; and
a communication mode adapted to send a modulated signal acquired through frequency conversion of a baseband signal via the first and second waveguides, in which
the receiver
receives a given signal via the second waveguide in the detection mode,
goes from the detection mode to the communication mode in response to the given signal received via the second waveguide, and receives the modulated signal via the first and second waveguides in the communication mode.

REFERENCE SIGNS LIST

11 Millimeter wave communication unit, 12 Waveguide, 13 Contact detection apparatus, 14 Control section, 21 Millimeter wave communication unit, 22 Waveguide, 23 Contact detection apparatus, 24 Control section, 100 Communication apparatus, 111 Millimeter wave communication unit, 112, 112S, 112R Waveguide, 113 Control section, 121 Transmitter, 122 Receiver, 123, 123S, 123R Antenna, 131 Mixer, 132 Oscillator, 133 Amplifier, 134, 135 Switch, 141 Amplifier, 142 Mixer, 143 LPF, 144 Switch, 200 Communication apparatus, 211 Millimeter wave communication unit, 212, 212S, 212R Waveguide, 213 Control section, 221 Transmitter, 222 Receiver, 223, 223S, 223R Antenna, 231 Mixer, 232 Oscillator, 233 Amplifier, 234, 235 Switch, 241 Amplifier, 242 Mixer, 243 LPF, 244 Switch

The invention claimed is:

1. A transmitter, comprising:
    circuitry configured to:
        transmit a given signal to a receiver in a detection mode of the transmitter, wherein
            the given signal is transmitted to the receiver via a first waveguide and a second waveguide, and
            the first waveguide is on a side of the transmitter and the second waveguide is on a side of the receiver;
        detect, in the detection mode, a contact between the first waveguide and the second waveguide based on a level of the given signal, received by the receiver, that is one of equal to a first threshold value or larger than the first threshold value;
        switch from the detection mode to a communication mode of the transmitter based on the detected contact; and
        transmit, in the communication mode, a modulated signal via the first waveguide and the second waveguide to the receiver.

2. The transmitter of claim 1, wherein the given signal is a narrow-band low-level signal narrower in band than the modulated signal and lower in level than the modulated signal.

3. The transmitter of claim 1, wherein
    circuitry is further configured to switch from the communication mode to the detection mode based on a level of the modulated signal, received by the receiver, that is one of larger than the first threshold value, equal to a second threshold value, or smaller than the second threshold value.

4. The transmitter of claim 1, wherein the circuitry is further configured to switch from the detection mode to the communication mode based on reflection of the given signal by an end face of the first waveguide.

5. The transmitter of claim 1, wherein
    each of the first waveguide and the second waveguide includes a piece of hollow metal, and
    the piece of hollow metal includes a dielectric.

6. The transmitter of claim 1, wherein each of the given signal and the modulated signal is a millimeter wave band signal.

7. A transmission method, comprising:
    transmitting a given signal to a receiver in a detection mode of a transmitter, wherein
        the given signal is transmitted to the receiver via a first waveguide and a second waveguide, and
        the first waveguide is on a side of the transmitter and the second waveguide is on a side of the receiver;
    detecting, in the detection mode, a contact between the first waveguide and the second waveguide based on a level of the given signal, received by the receiver, that is one of equal to a threshold value or larger than the threshold value;
    switching from the detection mode to a communication mode of the transmitter based on the detected contact; and
    transmitting, in the communication mode, a modulated signal via the first waveguide and the second waveguide to the receiver.

8. A receiver, comprising:
    circuitry configured to:
        receive a given signal from a transmitter in a detection mode of the receiver, wherein
            the given signal is received via a first waveguide and a second waveguide, and
            the first waveguide is on a side of the transmitter and the second waveguide is on a side of the receiver;
        detect, in the detection mode, a contact between the first waveguide and the second waveguide based on a level of the given signal, received by the receiver, that is one of equal to a first threshold value or larger than the first threshold value;
        switch from the detection mode to a communication mode of the receiver based on the detected contact; and
        receive, in the communication mode, a modulated signal via the first waveguide and the second waveguide from the transmitter.

9. The receiver of claim 8, wherein the given signal is a narrow-band low-level signal narrower in band than the modulated signal and lower in level than the modulated signal.

10. The receiver of claim 8, wherein
    the circuitry is further configured to switch from the communication mode to the detection mode based on a level of the received modulated signal that is one of larger than the first threshold value equal to a second threshold value, or smaller than the second threshold value.

11. The receiver of claim 8, wherein
    each of the first waveguide and the second waveguide includes a piece of hollow metal, and
    the piece of hollow metal includes a dielectric.

12. The receiver of claim 8, wherein each of the given signal and the modulated signal is a millimeter wave band signal.

13. A reception method, comprising:
    receiving a given signal from a transmitter in a detection mode of a receiver, wherein
        the given signal is received via a first waveguide and a second waveguide, and
        the first waveguide is on a side of the transmitter and the second waveguide is on a side of the receiver;
    detecting, in the detection mode, a contact between the first waveguide and the second waveguide based on a level of the given signal, received by the receiver, that is one of equal to a threshold value or larger than the threshold value;
    switching from the detection mode to a communication mode of the receiver based on the detected contact; and receiving, in the communication mode, a modulated signal via the first waveguide and the second waveguide from the transmitter.

\* \* \* \* \*